(12) United States Patent
Zachut

(10) Patent No.: US 9,323,368 B2
(45) Date of Patent: *Apr. 26, 2016

(54) DIGITIZER, STYLUS AND METHOD OF SYNCHRONIZATION THEREWITH

(71) Applicant: Microsoft Technology Licensing, LLC, Redmond, WA (US)

(72) Inventor: Rafi Zachut, Rishon-LeZion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/201,994

(22) Filed: Mar. 10, 2014

(65) Prior Publication Data

US 2014/0184567 A1 Jul. 3, 2014

Related U.S. Application Data

(63) Continuation of application No. 13/909,118, filed on Jun. 4, 2013, now Pat. No. 8,669,967, which is a continuation of application No. 12/643,004, filed on Dec. 21, 2009, now Pat. No. 8,481,872.

(60) Provisional application No. 61/193,751, filed on Dec. 22, 2008.

(51) Int. Cl.
*G06F 3/033* (2013.01)
*G06F 3/041* (2006.01)
*G06F 3/0354* (2013.01)
*G06F 3/044* (2006.01)

(52) U.S. Cl.
CPC ............ *G06F 3/041* (2013.01); *G06F 3/03545* (2013.01); *G06F 3/044* (2013.01); *G06F 3/0416* (2013.01); *G06F 2203/04104* (2013.01)

(58) Field of Classification Search
USPC ........................ 345/173, 174, 179; 178/18.03
See application file for complete search history.

(56) References Cited

U.S. PATENT DOCUMENTS

| | | |
|---|---|---|
| 3,818,133 A | 6/1974 | Cotter |
| 4,672,154 A | 6/1987 | Rodgers et al. |
| 5,120,908 A | 6/1992 | Zank et al. |
| 5,122,623 A | 6/1992 | Zank et al. |
| 5,138,118 A | 8/1992 | Russell |
| 5,373,118 A | 12/1994 | Watson |

(Continued)

FOREIGN PATENT DOCUMENTS

| | | |
|---|---|---|
| EP | 0573136 | 12/1993 |
| WO | WO 2005/081631 | 9/2005 |
| WO | WO 2008/086058 | 7/2008 |

OTHER PUBLICATIONS

Combined Search and Examination Report Under Section 17 and 18(3) Dated Apr. 23, 2010 From the Intellectual Property Office of the United Kingdom Re.: Application No. GB0922306.6.

(Continued)

*Primary Examiner* — Thuy Pardo

(57) ABSTRACT

A method for operating a digitizer with an autonomous asynchronous stylus includes sampling outputs from a digitizer, detecting from the outputs at least one pulsed signal transmitted from an autonomous asynchronous stylus at a defined rate, determining a location of the stylus interaction with respect to the digitizer, and tracking stylus interaction with the digitizer over subsequent pulsed signals transmitted from the stylus.

17 Claims, 16 Drawing Sheets

(56) References Cited

U.S. PATENT DOCUMENTS

| | | | |
|---|---|---|---|
| 5,420,379 A | 5/1995 | Zank et al. | |
| 5,571,997 A | 11/1996 | Gray et al. | |
| 5,591,945 A | 1/1997 | Kent | |
| 5,691,959 A | 11/1997 | Kriewall et al. | |
| 6,690,156 B1 | 2/2004 | Weiner et al. | |
| 7,019,672 B2 | 3/2006 | Ely | |
| 7,292,229 B2 | 11/2007 | Morag et al. | |
| 7,372,455 B2 | 5/2008 | Perski et al. | |
| 7,406,393 B2 | 7/2008 | Ely et al. | |
| 7,683,894 B2 | 3/2010 | Kent | |
| 8,022,317 B2 | 9/2011 | Ely | |
| 8,481,872 B2 | 7/2013 | Zachut | |
| 8,487,915 B1 | 7/2013 | Birger et al. | |
| 2001/0000666 A1 | 5/2001 | Wood et al. | |
| 2001/0006369 A1 | 7/2001 | Ely | |
| 2005/0171714 A1 | 8/2005 | Ely et al. | |
| 2006/0012581 A1* | 1/2006 | Haim et al. | 345/173 |
| 2007/0030258 A1 | 2/2007 | Pittel et al. | |
| 2007/0062852 A1 | 3/2007 | Zachut et al. | |
| 2007/0085836 A1 | 4/2007 | Ely | |
| 2008/0128180 A1 | 6/2008 | Perski et al. | |
| 2008/0143691 A1* | 6/2008 | Cook | G06F 3/03545 345/179 |
| 2008/0170046 A1* | 7/2008 | Rimon | G06F 3/044 345/174 |
| 2008/0238885 A1 | 10/2008 | Zachut et al. | |
| 2009/0078476 A1* | 3/2009 | Rimon et al. | 178/18.03 |
| 2009/0127005 A1 | 5/2009 | Zachut et al. | |
| 2009/0184940 A1 | 7/2009 | Silk et al. | |
| 2009/0251434 A1 | 10/2009 | Rimon et al. | |
| 2010/0321338 A1* | 12/2010 | Ely | G06F 3/03545 345/174 |
| 2011/0254807 A1* | 10/2011 | Perski | G06F 3/0418 345/174 |
| 2012/0132712 A1 | 5/2012 | Babu et al. | |
| 2012/0293458 A1 | 11/2012 | Perski et al. | |
| 2013/0027361 A1 | 1/2013 | Perski et al. | |
| 2013/0265281 A1 | 10/2013 | Zachut | |

OTHER PUBLICATIONS

Official Action Dated Aug. 6, 2013 From the US Patent and Trademark Office Re. U.S. Appl. No. 13/909,118.

* cited by examiner

DIGITIZER, STYLUS AND METHOD OF SYNCHRONIZATION THEREWITH

RELATED APPLICATIONS

This application is a continuation of U.S. patent application Ser. No. 13/909,118 filed on Jun. 4, 2013 which is a continuation of U.S. patent application Ser. No. 12/643,004 filed on Dec. 21, 2009, now U.S. Pat. No. 8,481,872, which claims the benefit of priority under section 35 U.S.C. §119(e) of U.S. Provisional Patent Application No. 61/193,751 filed on Dec. 22, 2008. The contents of the above applications are incorporated herein by reference.

FIELD OF THE INVENTION

The present invention, in some embodiments thereof, relates to digitizer sensors, signal transmitting styluses used for interaction with digitizer sensors and more particularly, but not exclusively to synchronization between signal transmitting styluses and digitizer sensors.

BACKGROUND OF THE INVENTION

Electromagnetic styluses are known in the art for use and control of a digitizer. Position detection of the stylus provides input to a computing device associated with the digitizer and is interpreted as user commands. Position detection is performed while the stylus tip is either touching and/or hovering over a detection surface of the digitizer. Often, the digitizer is integrated with a display screen and a position of the stylus over the screen is correlated with virtual information portrayed on the screen.

PCT Patent Publication No. WO2008086058 entitled "Multiple Styli Annotation System," the contents of which is incorporated herein by reference, describes an apparatus for stroke capture and retrieval that works with an annotation capture and recording system that can operate with several styli active at the same time. The apparatus includes at least one ultrasound signal sensor operative to receive ultrasound signals from one or more styli when the one or more styli are operating in a defined working area of the apparatus and at least one electromagnetic receiving unit operative to receive electromagnetic signals from an electromagnetic transmitter of the stylus. Coordination between the apparatus and a plurality of styli is provided by a controller that instructs each of the styli to transmit its ultrasound signal at a dedicated time slot. Positioning is determined and tracked based on received ultrasound signals.

U.S. Pat. No. 7,292,229 entitled "Transparent Digitizer" which is assigned to N-trig Ltd., the contents of which is incorporated herein by reference, describes a passive electromagnetic stylus which is triggered to oscillate at a resonant frequency by an excitation coil surrounding a digitizer. The oscillating signal is sensed by the digitizer. The stylus operates in a number of different states including hovering, tip touching, right click mouse emulation, and erasing. The various states are identified by altering the resonant frequency of the stylus so that the stylus resonates at a different frequency in each state. A position of the stylus, e.g. a position of the stylus' tip with respect to the digitizer sensor is determined based on signals sensed from sensor.

U.S. Patent Application Publication No. 2008/0128180 entitled "Position Detecting System and Apparatuses and Methods for Use and Control Thereof" assigned to N-Trig Ltd., the contents of which is incorporated herein by reference, describes an electromagnetic stylus that emits signals at an oscillation frequency that can be picked up by a digitizer sensor and used to determine its position on the sensor. The stylus includes a variable element, e.g. a resistor, capacitor, or an inductor, that is responsive to pressure exerted on the stylus tip by the user and triggers changes in the frequency emitted by the stylus. The digitizer system is operable to discern between different frequencies emitted by the stylus to determine a position of the stylus and a pressure exerted on the stylus tip by the user.

US Patent Application Publication No. 2008/0238885 entitled "System and method for multiple object detection on a digitizer system" assigned to N-Trig LTD, the contents of which is hereby incorporated by reference, describes a digitizer system including at least one object with an electronic tag configured for radiating at least one modulated signal and at least one second signal; a digitizer sensor configured for detecting the at least one second signal while the object is positioned on or over the digitizer sensor; and circuitry configured for identifying the object based on modulation of the at least one modulated signal and for determining a position of the object on or over the digitizer based on the detected second signal on a portion of the digitizer sensor. Optionally, the modulated signal is transmitted in response to an excitation signal.

U.S. Pat. No. 5,571,997 entitled "Pressure sensitive pointing device for transmitting signals to a tablet" the contents of which is incorporated herein by reference, describes a pressure sensitive pointing device or pen for use with an electronic tablet that determines the position of the pointing device on the surface of the tablet. The pointing device incorporates a variable reluctance circuit responsive to the force exerted on the pen point for modulating a radiating frequency, emanating from the pen, in proportion to the force.

SUMMARY OF THE INVENTION

According to an aspect of some embodiments of the present invention there is provided a method for operating a digitizer sensor with an autonomous asynchronous stylus that transmits signal bursts at a defined rate. As used herein, an autonomous asynchronous stylus refers to a stylus that generates a transmitting signal that is not triggered by and/or synchronized with a signal transmitted from the digitizer or digitizer related circuitry. According to some embodiments of the present invention, the signal burst is a modulated signal, e.g. it includes encoded information regarding an operational state of the stylus and/or user command. According to some embodiments of the present invention there is provided a digitizer operable to detect signal bursts transmitted by a stylus in an operating vicinity of a digitizer and to sample the detected signal bursts.

An aspect of some embodiments of the present invention is the provision of a method for operating a digitizer with an autonomous asynchronous stylus, the method comprising: sampling outputs from a digitizer; detecting from the outputs at least one pulsed signal transmitted from an autonomous asynchronous stylus at a defined rate; determining a location of the stylus interaction with respect to the digitizer; and tracking stylus interaction with the digitizer over pulses transmitted pulsed signals transmitted from the stylus.

Optionally, the method comprises determining timing of the detected pulsed signal within a refresh cycle of the digitizer; and synchronizing the refresh cycles of the digitizer with the timing of the received pulsed signal.

Optionally, the method includes simultaneously detecting finger touch interaction and the stylus interaction with the digitizer.

Optionally, the finger touch interaction is detected with at least one of a single touch detection method and a multi-touch detection method.

Optionally, the digitizer switches from detection using a multi-touch detection method to detection using a single touch detection method in response to detection of a stylus pulsed signal.

Optionally, the method includes simultaneously detecting conductive object interaction and stylus interaction with the digitizer.

Optionally, the digitizer includes a grid based digitizer sensor including conductive lines arrayed along a first and second axis of the digitizer sensor.

Optionally, timing of the detected pulsed signal is determined from output obtained from 1-4 selected conductive lines from which the pulsed signal is most strongly detected.

Optionally, the method includes triggering at least a portion of the conductive lines with a triggering signal, and detecting finger touch interaction in response to the triggering.

Optionally, the method includes synchronizing triggering of the conductive lines with timing of the detected pulsed signal.

Optionally, the method includes sampling conductive lines arrayed along the second axis of the digitizer sensor in response to triggering of a conductive line arrayed along the first axis of the digitizer sensor.

Optionally, the timing of a stylus signal is determined based on output sampled from only one of the first or second axis of the digitizer.

Optionally, the method includes sampling a digitizer over a plurality of chunk sampling periods, wherein the plurality of chunk sampling periods cover a full transmission cycle of a stylus pulsed signal over a plurality of refresh cycles of the digitizer.

Optionally, the synchronizing is performed while the stylus is hovering over the digitizer.

Optionally, the method includes adjusting the synchronizing during tracking of the stylus based on timing of pulsed signals received in the subsequent refresh cycles.

Optionally, the output is sampled over at least one chunk sampling period during each refresh cycle of the digitizer.

Optionally, the method includes substantially synchronizing the chunk sampling periods of the digitizer with the timing of the detected pulsed signal.

Optionally, the method includes initiating the chunk sampling periods of the refresh cycles of the digitizer at a predetermined period before the timing of the detected stylus pulsed signal within the refresh cycle of the digitizer.

Optionally, a transmission cycle of the stylus varies for different operational modes of the stylus and wherein the digitizer is operative to detect and track the stylus pulsed signal at varying transmission cycles.

Optionally, the pulsed signal comprises an AC burst signal of a pre-defined frequency.

Optionally, the digitizer detects the pulsed signal of the stylus based on detection of the pre-defined frequency.

Optionally, the detecting comprises running a DFT window tuned to the pre-defined frequency on the outputs sampled during at least one refresh cycle.

Optionally, the method comprises determining an operational state of the stylus from the detected pulsed signal.

Optionally, the stylus transmits a train of pulsed signals transmitted in succession over a transmission cycle of the stylus and wherein the digitizer samples the train of pulsed signals over a refresh period of the digitizer.

Optionally, at least one of the pulsed signals in the train of pulsed signal includes encoded information.

Optionally, the encoded information is selected from the group including: identification of the stylus, right click mode of the stylus, eraser mode of the stylus, pressure on tip of the stylus, and user selected color.

Optionally, the method includes decoding information encoded in at least one stylus pulsed signal from the outputs.

An aspect of some embodiments of the present invention is the provision of a method for operating a digitizer with an autonomous asynchronous stylus, the method comprising: receiving pulsed signals by the digitizer from the autonomous stylus; determining a location on the digitizer from which the pulsed signal is detected; and tracking stylus interaction with the digitizer over subsequent refresh cycles.

Optionally, the method comprises simultaneously detecting finger touch interaction and stylus interaction, wherein the stylus interaction is performed with the asynchronous stylus.

Optionally, the finger touch interaction is detected with at least one of a single touch detection method and a multi-touch detection method.

An aspect of some embodiments of the present invention is the provision of a method for operating a digitizer with an autonomous asynchronous stylus, the method comprising: receiving pulsed signals by the digitizer from the autonomous stylus, said signals including information; determining a location on the digitizer from which the pulsed signal is detected; and detecting finger touch interaction with the digitizer.

An aspect of some embodiments of the present invention is the provision of a digitizer system operated with an asynchronous stylus comprising: a digitizer sensor that receives signals; a stylus that transmits autonomous asynchronous signals, said signals including information on an operational state of the stylus; and a processor in the digitizer system that determines position coordinates on the digitizer sensor and the operational state of the stylus from the received signals.

Optionally, the digitizer sensor senses finger touch interaction and wherein the processor determines position coordinates of the finger touch interaction.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
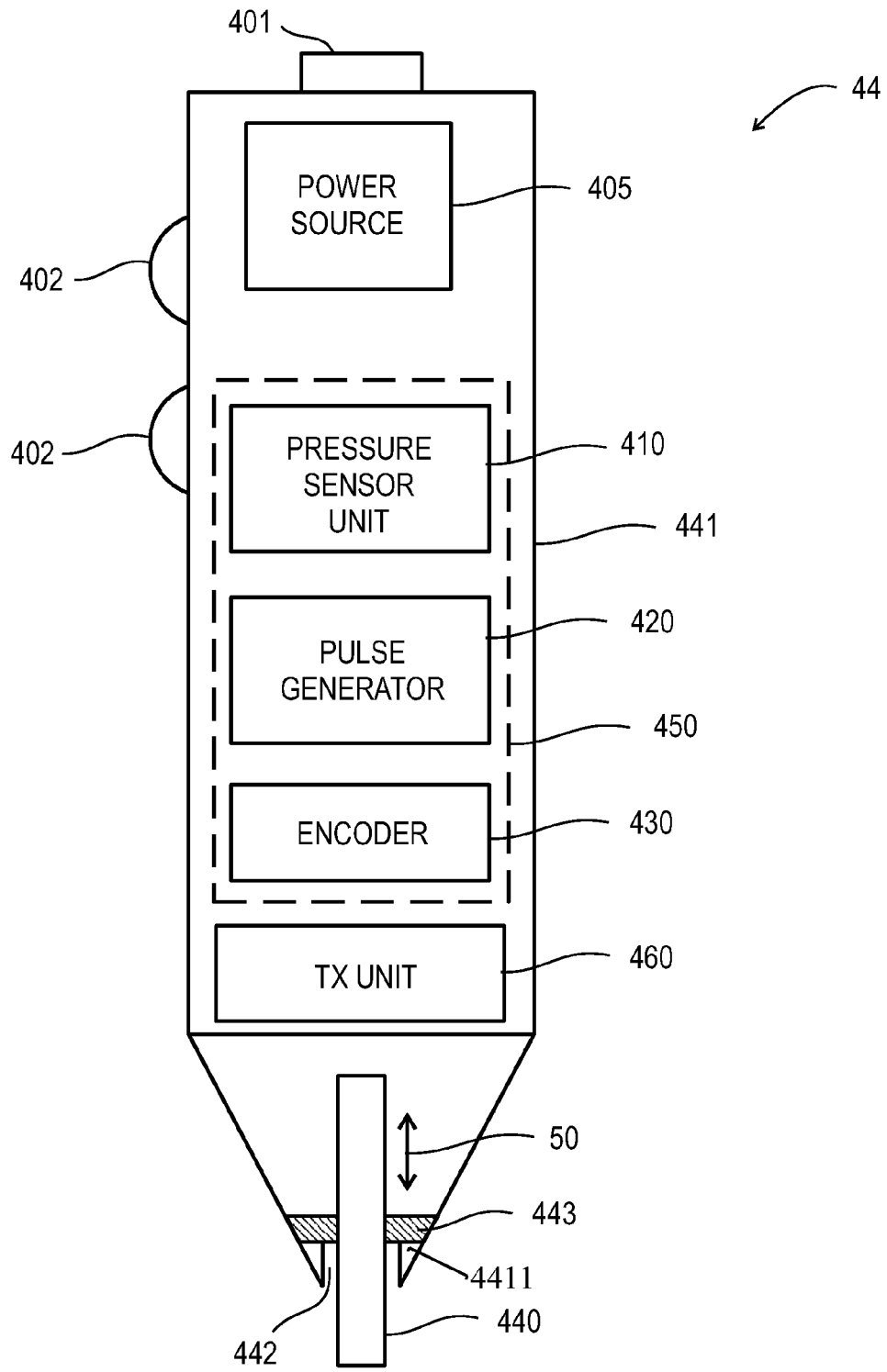
FIG. 1 is a simplified block diagram of an exemplary signal transmitting stylus in accordance with some embodiments of the present invention in accordance with some embodiments of the present invention.

The present invention, in some embodiments thereof, relates to digitizer sensors, signal transmitting styli used for interaction with digitizer sensors and more particularly, but not exclusively to synchronization between signal transmitting styluses and digitizer sensors.

An aspect of some embodiments of the present invention, provides for a digitizer that can operate with an autonomous asynchronous transmitting stylus. In some exemplary embodiments, the stylus transmits a signal burst that is modulated. Optionally, the signal burst includes a train of modulated signals, e.g. bursts encoding information regarding one or more operational states of the stylus and/or user commands. Optionally, a synchronization signal and/or beacon signal is included in the signal burst and is used for synchronizing the digitizer with the stylus. Optionally, the synchronization signal is also used by the digitizer as a positioning signal for locating and tracking the stylus and/or stylus interaction with respect to the digitizer sensor. Typically the stylus is self-powered, e.g. battery operated.

The present inventors have found that energy consumption of a stylus that periodically transmits short signal bursts as is described herein is significantly less than styli that transmits a continuous signal during their operation as are known in the art. By reducing the energy consumption, a battery life of the stylus can be increased.

An aspect of some embodiments of the present invention provides for synchronizing a refresh cycle of a digitizer with a transmission period of an autonomous stylus. Optionally, the refresh cycle of the digitizer is synchronized with a synchronization signal transmitted by the stylus. According to some embodiments of the present invention, the stylus transmits a signal burst including a synchronization signal during each transmission period of the stylus. The length of the transmission period typically matches a refresh period of the digitizer and/or is typically a multiple integer of a length of the refresh period of the digitizer.

According to some embodiments of the present invention, synchronization of the stylus and digitizer is provided without requiring transmission of a triggering signal, (and/or excitation pulse) from an excitation coil (or other transmitter) associated with the digitizer for providing the triggering signal or optionally other signal to the stylus. The present inventors have found that the cost as well as the dimensions of the digitizer can be reduced by eliminating the elements for triggering the stylus. Energy consumption of the digitizer system without the triggering element for triggering the stylus is also significantly reduced. Typically, triggering occupies a portion of a cycle time of the digitizer, e.g. 2.5 msec. If triggering is avoided, the cycle time allotted to transmit the triggering signal, e.g. 2.5 msec can be saved. In addition, the triggering signal emitted typically drives relatively high signals on the sensor lines of the digitizer, which could cause saturation. Typically, to avoid sampling when the output is saturated a blanking period is imposed that typically overlaps with part of a transmission period of the stylus. In some embodiments of the present invention, a blanking period of the digitizer sensor typically required while transmitting a triggering signal can also be avoided.

According to some embodiments of the present invention, a presence of a stylus within an operating range of the digitizer is identified during a search mode (coarse detection mode) of the digitizer. In some exemplary embodiments, during a search mode a digitizer alternates chunk sampling periods over which input to the digitizer is sampled so that an entire duration of a stylus transmission period is sampled over a plurality of refresh cycles of the digitizer. As used herein, a chunk sampling period is a duration over which output from the digitizer sensor is sampled. Typically, the digitizer output is repeatedly sampled at a defined sampling rate, e.g. 100 KHz or 200 KHz during each chunk sampling period. Optionally, the chunk sampling periods partially overlap. Typically, timing of a received stylus pulse is approximated, e.g. determined coarsely during this search mode. Optionally, other user interactions, e.g. finger touch interaction and/or conductive object interaction, concurrently interacting with the digitizer sensor are tracked during a search mode period of the digitizer. Typically, methods applied to detect conductive object interaction are similar and/or the same as the methods applied to detect finger touch interaction. In some exemplary embodiments, when a stylus is identified during a search mode, tracking positioning of stylus is initiated based on the received stylus pulse. Tracking is provided although the timing of the stylus pulse, e.g. the onset of the received pulse, may not be preciously determined.

In some exemplary embodiments, in response to receiving signals from a stylus within one or more of the chunk sampling periods, a finer tuned search is performed over subsequent refresh cycles using a filtering window stepped around the time vicinity of the identified signal to determine an onset of reception. Optionally, fine tuning is performed on output obtained close to an identified location of the stylus. According to some embodiments of the present invention, a refresh period of the digitizer is synchronized, e.g. adjusted to coincide with, the detected onset of signal reception from the stylus.

Typically, once synchronization is established, the digitizer operates in a tracking mode where it tracks the detected stylus as well as any other user interactions concurrently interacting with the digitizer, e.g. finger tip. Typically, during track mode a single chunk sampling period for sampling.

Optionally, input received from the stylus is processed to determine information encoded by signal modulation. Encoded information may include for example, identification data, pressure state of the stylus tip, right click mode, erase mode, selected color, hover and/or touch type interaction. Optionally, during a tracking mode synchronization between the digitizer and identified stylus is periodically adjusted as required.

Reference is now made to FIG. 1 showing a simplified block diagram of an exemplary signal transmitting stylus in accordance with some embodiments of the present invention. According to some embodiments of the present invention, a stylus 44 is an autonomous asynchronous device that transmits pulses of energy, e.g. an electric signal generated with a pulse generator 420 with a transmitting unit 460. According to some embodiments of the present invention, pulse generator 420 generates one or more AC signal bursts providing pulsed signals (AC pulses), e.g. a train of pulses (signal bursts). Optionally, the AC pulses have a frequency content selected between 20-40 KHz. Typically, pulse generator 420 generates pulses having a frequency content other than the frequencies typically used to detect finger touch on a digitizer. Typically, a frequency of burst signal of stylus 44 is orthogonal to the frequencies typically used to detect finger touch in the sampling space or far enough away so that simultaneous user interaction (finger and stylus) may be possible. Optionally, specific time slots for finger touch detection and stylus are defined to avoid close frequencies. In some exemplary embodiments, pulse generator 420 generates pulses having a width between 1-2 msec, e.g. 1.28 msec.

According to some embodiments of the present invention, stylus 44 is powered by power source 405. Typically, power source 405 includes one or more batteries, e.g. 4A alkaline battery. Optionally rechargeable batteries are used. Optionally, a voltage stabilizer also included in stylus 44 is used to stabilize voltage from power source 405.

According to some embodiments of the present invention, stylus 44 includes a power switch 401 for powering transmission of stylus 44 and one or more operational switches and/or dials 402 for receiving operation commands from a user. Typically switches 402 control right click and eraser mode commands as well as color selection when writing or drawing with the stylus. Optionally, a rocker switch is used for right click or eraser operation, e.g. at least one of switches 402 is a rocker switch.

Optionally, tip 440 of stylus 44 is operative as an antenna of transmission unit 460 and/or an electric dipole. For example, one output of pulse generator 420 is electrically connected to stylus tip 440 (typically constructed from a conductive material) while the other end is electrically connected to a frame 4411 (which likewise comprises conductive material) surrounding tip 440. Typically, frame 4411 is integral to housing 441 and is grounded. An electric field, synchronized to a generated signal pulse, is formed in a small gap 442 located between the tip 440 and the frame 441. The geometric dimensions of the gap and the consequent field are relatively small so that the field source can be substantially close to the stylus tip and thereby provide a concentrated signal at the tip. Signals transmitted by the stylus can be picked up at a relatively concentrated point by a digitizer or other sensing surface and the position of the stylus at that position can be conveyed to the digitizer. Optionally, stylus 44 includes a separate antenna and does not use tip 440 for transmitting output signals.

Optionally, stylus 44 is a pressure sensitive stylus that transmits information regarding contact pressure applied to tip 440. In some exemplary embodiments, tip 440 recedes into housing 441 in axial direction 50 in response to applied contact pressure by a user operating the stylus, e.g. pressing tip on a surface and is subsequently released when the contact pressure is released, e.g. a hovering state or non-operational state of the stylus. Typically, during axial movement tip 440 is engaged with a resilient element 443, e.g. a spring whose properties are selected to obtain a desired relationship between contact pressure and axial displacement.

In some exemplary embodiments, a pressure sensor unit 410 senses contact pressure applied to tip 440 and based on sensed contact pressure level, a frequency content of a pulse generated by pulse generator 420 is altered and/or defined. In some exemplary embodiments, a specific frequency band is allocated for transmitting pressure information. For example within the frequency band of 20-40 KHz, e.g. 20-25is allocated for transmitting pressure information. Optionally, output from pressure sensor unit 410 is encoded with encoder 430 on pulse generated by pulse generator 420.

According to some embodiments of the present invention, encoder 430 is a digital encoder operable to encode an operational state of stylus 44 and/or identification information of stylus 44 into a pulse generated by pulse generator 420. Typically, operational state of stylus 44 is obtained from switch state of switches 402. Optionally, pressure state of the digitizer is encoded with encoder 430. One or more encoding methods selected from Amplitude Shift Keying (ASK), Phase Shift Keying (PSK) and Frequency Shift Keying (FSK) may be used to encode information with encoded 430. In some exemplary embodiments, encoded information is transmitted over a plurality of transmission cycles. For example one bit of encoded information is transmitted per transmission cycle.

According to some embodiments of the present invention, pulse generator 420, encoder 430 and pressure sensor unit 440 and/or their functionality are embedded in an ASIC unit 450.

According to some embodiments of the present invention, a time between pulses matches a refresh cycle of a digitizer or an integer multiple of a refresh cycle of a digitizer, e.g. twice a refresh cycle of a digitizer and/or three of four times a refresh frequency of a digitizer. Optionally, a time between pulses (bursts) is variable and is controllably altered based on an operational state of the digitizer.

Figure 2A:
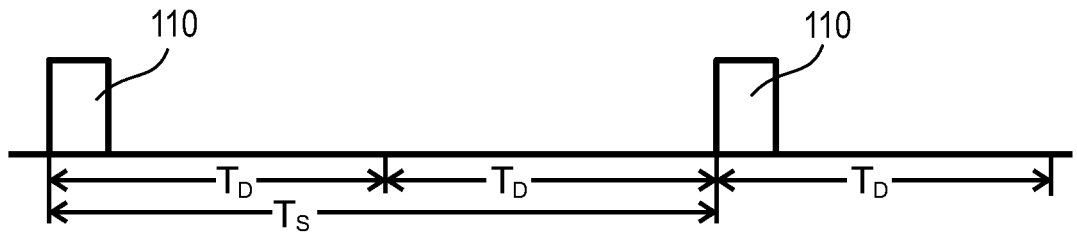
FIGS. 2A-2C are simplified exemplary time lines showing transmission pulses transmitted by a stylus in accordance with some embodiments of the present invention.
Figure 2B:
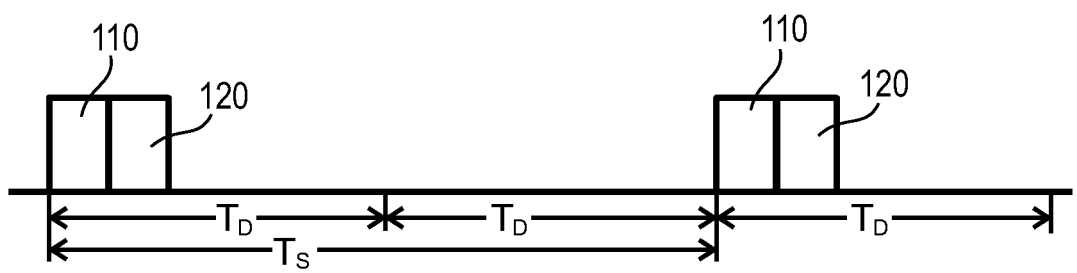
Figure 2C:
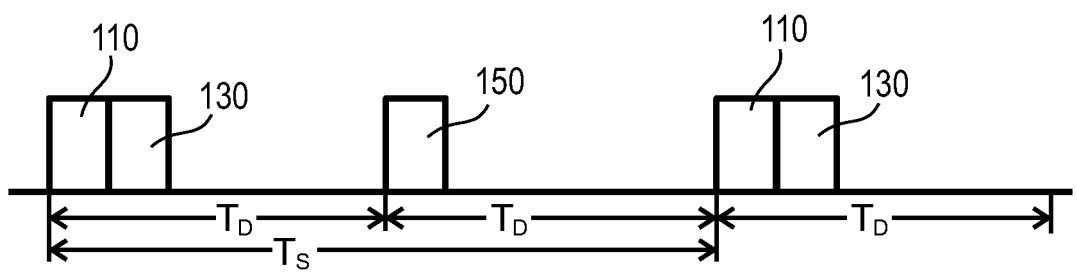

Reference is now made to FIGS. 2A, 2B and 2C showing simplified exemplary time lines showing transmission pulses transmitted by a stylus in accordance with some embodiments of the present invention. Referring first to FIG. 2A, in some exemplary embodiments, stylus 44 transmits a pulse 110 once over a stylus transmission period $T_S$. According to some embodiments of the present invention, pulse 110 is an AC signal burst of a predefined width, e.g. duration. Optionally, $T_S$ is defined to be twice a refresh cycle or period of a receiving digitizer $T_D$ so that a digitizer receiving signals from stylus 44 will potentially receive a signal every other refresh cycle $T_D$ of the digitizer. In some exemplary embodiments, stylus 44 transmits signals every 15 msec ($T_S$=15 msec) to a digitizer that samples its signals every 7.5 msec ($T_D$=7.5 msec). In some exemplary embodiments, pulse 110 is a beacon pulse used to locate a position of tip 440 in relation to a digitizer receiving pulse 110 and/or to synchronize the digitizer with timing of the stylus pulses (AC burst signals). Typically, pulse 110 is transmitted at a pre-defined amplitude, e.g. 20 V and frequency and does not include encoded information. Typically, the digitizer can identify a stylus pulse with amplitude in the order of about 1 mV. In some exemplary embodiments, a transmission pattern as shown in FIG. 2A is used while stylus 44 is hovering over a digitizer and none of right click mode or eraser mode is selected (with operational and/or selection switches 402). In some exemplary embodiments, a lower rate for repeating transmission of stylus' pulses and/or lower accuracy of the stylus position during hover mode is used in exchange for reduced energy consumption of the stylus as well as the detecting digitizer. Optionally, a frequency of transmission of pulse 110 is altered based on operational state of stylus 44 and/or its battery life.

Referring now to FIG. 2B, in some exemplary embodiments, stylus 44 transmits an additional pulse 120 (or pulses) that trails a first pulse 110. Typically, a signal burst represented by trailing pulse 120 differs and/or is distinguished from beacon pulse 110 by frequency of its AC burst signal and/or phase of its AC burst signal. In some exemplary embodiments, trailing pulse 120 is an analogue encoded burst signal. In some exemplary embodiments, trailing pulse 120 provides information regarding an operational state of stylus 44. Optionally, trailing pulse 120 indicates a right click or eraser operational state of stylus 44. In some exemplary embodiments, AC signal burst 110 and 120 have a same frequency of oscillation and information embedded in pulse 120 (digital or analog encoding) is derived from a phase of the AC burst signal of pulse 120 in relation to a phase of the AC burst signal of pulse 110. Optionally, 0 degree phase shift indicates right click mode command and a 180 degree phase shift indicates eraser mode command. According to some embodiments of the present invention, a scalar product of an energy vector measured for pulse 110 by the digitizer and an energy vector measured for pulse 120 by the digitizer is determined. If there is an integer number of cycles included in the pulses and the scalar product is positive than most likely pulse 120 is in phase with pulse 110, e.g. 0 degree phase shift, otherwise pulse 120 is most likely shifted by a 180 degree phase shift. Optionally, the phase can be determined by majority voting. According to some embodiments of the present invention, determining an operational state of the stylus, e.g. right click or eraser mode, based on differences in phase between AC signal burst 110 and 120 avoids errors associated with locking on the exact timing of the onset of AC signal burst 110 and the onset of AC signal burst 120 that directly trails AC signal burst 110. By using the same frequency as the beacon signal for right click and erase commands, more frequencies are available for encoding additional information, e.g. pressure tip information. Typically, the frequency band of the stylus is limited since frequencies used for finger detection are avoided. Alternatively, a frequency of the AC signal of pulse 120 is indicative of the information supplied by pulse 120.

Referring now to FIG. 2C in some exemplary embodiments, a timing between transmission of stylus pulses is increased, e.g. doubled, while the stylus 44 is in tip mode, e.g. contact pressure is detected on stylus tip 440 and none of right click mode or eraser mode is selected, e.g. with switches 402. Optionally, during a tip mode, stylus 44 alternates between transmitting a beacon signal 110 and a pressure pulse 150 indicating a pressure level on tip 440. In some exemplary embodiments, pressure is an AC signal with a frequency related to a pressure level detected by stylus 44. According to some embodiments of the present invention, pressure pulse 150 includes frequencies that are orthogonal or far away enough away from frequencies used for touch detection to enable simultaneous detection of stylus pressure and touch. Optionally, dedicated time slots, e.g. time division is used for sampling of stylus pressure and touch so that they can be differentiated.

Optionally, pressure pulse 150 is a digitally encoded pulse indicating one out of a plurality of defined pressure levels.

According to some embodiments of the present invention, during a tip mode a trailing pulse 130 following a beacon pulse 110 transmits additional information to a receiving digitizer, e.g. identification, and color for tracing. Optionally, trailing signal 130 encodes one bit of digitally encoded signal for providing additional information to a receiving digitizer. Optionally, while the pen is in right click mode and/or eraser mode, pressure pulse 150 and digitally encoded pulse 130 are not transmitted.

According to some embodiments of the present invention, each of pulses, 110, 120, 130, 150 have a same width. Optionally, a 1.28 msec pulse width is used for each transmission pulse. Typically, detection is established in a hover mode where the signal to noise ratio is typically less than that of a tip mode. In some exemplary embodiments, a stylus is identified while its tip is hovering over the digitizer at a height of up to 15-20 mm. Optionally, amplitude of pressure pulse 150 is the same as beacon signal 110. Optionally, amplitude of pulses transmitted by the stylus is reduced during a tip operation mode, e.g. above a pre-defined tip pressure to reduce energy expenditure. Since the signal noise ratio during a tip operational mode is greater than the signal to noise during a hover state a lower amplitude may be sufficient for detection.

According to some embodiments of the present invention, patterns of transmission pulses from a stylus and information transmitted from a stylus may be similar to those described in U.S. patent application Ser. No. 12/546,753 entitled "Pressure sensitive stylus for a digitizer," assigned to N-Trig, and the contents of which is incorporated herein by reference.

Figure 3:
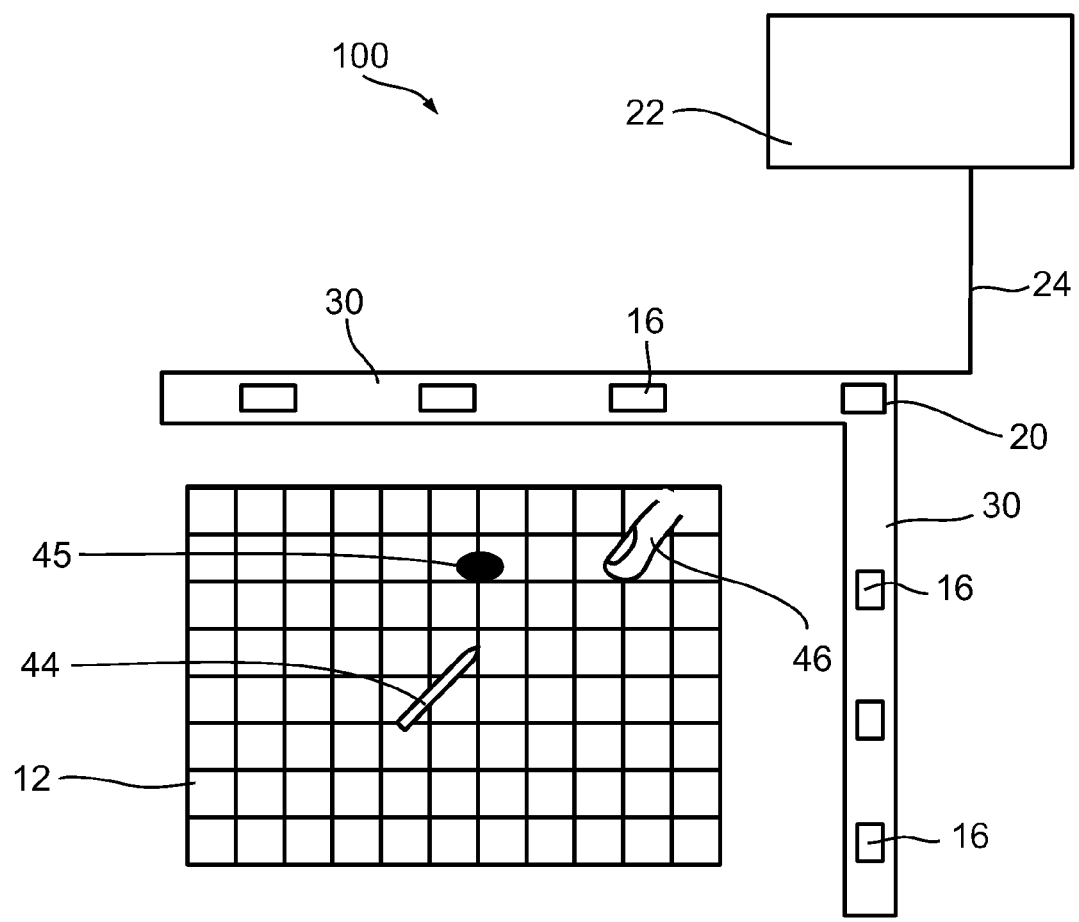
FIG. 3 is a simplified diagram of a digitizer system for use with a signal transmitting stylus in accordance with some embodiments of the present invention.

Reference is now made to FIG. 3 showing a simplified block diagram of a digitizer system for use with a signal transmitting stylus in accordance with some embodiments of the present invention. The digitizer system 100 shown in FIG. 3 may be suitable for any computing device that enables interactions between a user and the device, e.g. mobile computing devices that include, for example, FPD screens. Examples of such devices include Tablet PCs, pen enabled lap-top computers, PDAs or any hand held devices such as palm pilots and mobile phones. According to some embodiments of the present invention, the digitizer system is operative to detect multiple inputs from one or more styli 44, finger(s) 46 and/or a conductive object(s) 45. According to some embodiments of the present invention, stylus 44 is an autonomous asynchronous stylus that periodically transmits signal bursts and/or pulses.

According to some embodiments of the present invention, the digitizer system comprises a sensor 12 including a patterned arrangement of conductive lines (sensor lines), which is optionally transparent, and which is typically overlaid on a FPD 10. Typically sensor 12 is a grid based sensor including horizontal and vertical conductive lines. Optionally, a width of the conductive lines varies over its length. In some exemplary embodiments, a width of the conductive lines are narrower around the vicinity of junction points of the grid and wider between junction points. Optionally, the conductive lines are shaped like diamond shape array with diamond points are matched to junction points.

Typically, the parallel conductive lines are equally spaced straight lines, and are input to amplifiers included in ASIC 16. Optionally the amplifiers are differential amplifiers. Typically, the parallel conductive lines are spaced at a distance of approximately 2-8 mm, e.g. 4 mm, optionally depending on the size of the FPD and a desired resolution.

An ASIC 16 comprises circuitry to process and sample the sensor's output into a digital representation. The digital output signal is forwarded to a digital unit 20, e.g. digital ASIC unit, for further digital processing. According to some embodiments of the present invention, digital unit 20 together with ASIC 16 serves as the controller of the digitizer system and/or has functionality of a controller and/or processor. Optionally, a single unit is used—for example in small screen with limited number of lines. According to some embodiments of the present invention, ASICs 16 operate as a detection unit for processing and sampling the sensor's output. The outcome, once determined, is forwarded to a host 22 via an interface 24 for processing by the operating system or any current application. According to some embodiments of the present invention, control functionality is additionally or exclusively included in the host 22. ASIC 16 and digital unit 20 may be provided as a single ASIC. Optionally digital unit 20 and ASICs 16 are mounted on a PCB 30, e.g. L-shaped PCB positioned along two sides of sensor 12.

Typically, ASIC 16 is connected to outputs of the various conductive lines in the grid and functions to process the received signals at a first processing stage. Optionally, instead of PCB 30 positioned along two sides of sensor 12, a flex cable is used to connect the conductive lines to ASICs 16, e.g. positioned away from a sensing surface of digitizer 100. As indicated above, ASIC 16 typically includes one or more arrays of amplifiers, e.g. an array of differential amplifiers, an array of single ended amplifiers, or an array of differential amplifier optionally including one grounded input to amplify the sensor's signals. In some exemplary embodiments, the grounding input is selected by ASIC 16. Additionally, ASIC 16 optionally includes one or more filters to remove irrelevant frequencies. Optionally, filtering is performed prior to sampling. The signal is then sampled by an A/D, optionally filtered by a digital filter and forwarded to digital ASIC unit, for further digital processing. Alternatively, the optional filtering is fully digital or fully analog.

According to some embodiments of the invention, digital unit 20 receives the sampled data from ASIC 16, reads the sampled data, processes it and determines and/or tracks the position of physical objects, such as stylus, and/or finger, touching the digitizer sensor. According to some embodiments of the invention, digital unit 20 is operative to decode information encoded in a signal transmitted by stylus 44, e.g. pressure on tip, right-click and eraser mode, color for tracing, and identification. According to some embodiments of the present invention hovering of an object, e.g. stylus, finger and hand, is also detected and processed by digital unit 20. Calculated position is sent to the host computer via interface 24.

According to some embodiments of the present invention, digital unit 20 is operative to synchronize a refresh cycle of digitizer system 100 with a transmission period of autonomously transmitting stylus 44. According to some embodiments of the present invention, digital unit is operable to switch between different patterns of chunk sampling periods depending on a detection state of the digitizer for detecting an autonomous stylus, e.g. coarse detection, fine detection and tracking mode detection. Details describing detection of an autonomous stylus and synchronization of the digitizer is provided herein below.

In some exemplary embodiment, the digitizer system 100 has several channels, i.e. interfaces included within interface 24, with the host computer. In an exemplary embodiment, a stylus interface is provided for transmitting stylus coordinates on the display screen and finger touch interface is provided for transmitting finger touch coordinates on the display screen. In some exemplary embodiments, finger touch coordinates based on both single touch detection method and multi-touch detection method is transmitted on a same interface. Optionally, the interface transmits information on detected gestures.

According to some embodiments of the present invention, digital unit 20 is operative to control operation of one or more ASIC(s) 16. According to some embodiments of the present invention, digital unit 20 is operative to provide a command signal to ASIC 16 to switch between a plurality of available circuit paths (two or more) to connect to outputs of the various conductive lines in the grid. In some exemplary embodiments, digital unit 20 together with ASIC 16 provides for alternately connecting outputs of the various conductors to one of an array of differential amplifiers and an array of single ended amplifiers (or differential amplifiers with one grounded input). According to some embodiments of the present invention, digital unit 20 is operative to control triggering of one or more conductive lines. According to some embodiments of the present invention, ASIC 16 together with digital unit 20 provides for triggering various conductors with an oscillating signal having a selected pre-defined frequency or frequencies.

According to some embodiments of the invention, digital unit 20 includes at least a memory unit and a processing unit to store and process information obtained from ASIC 16. Memory and processing capability is also generally included in host 22 and ASIC 16. According to some embodiments of the present invention memory and processing functionality may be divided between any two or three of host 22, digital unit 20, and ASIC 16 or may reside in only digital unit 20 and host 22.

Stylus Detection

Figure 4:
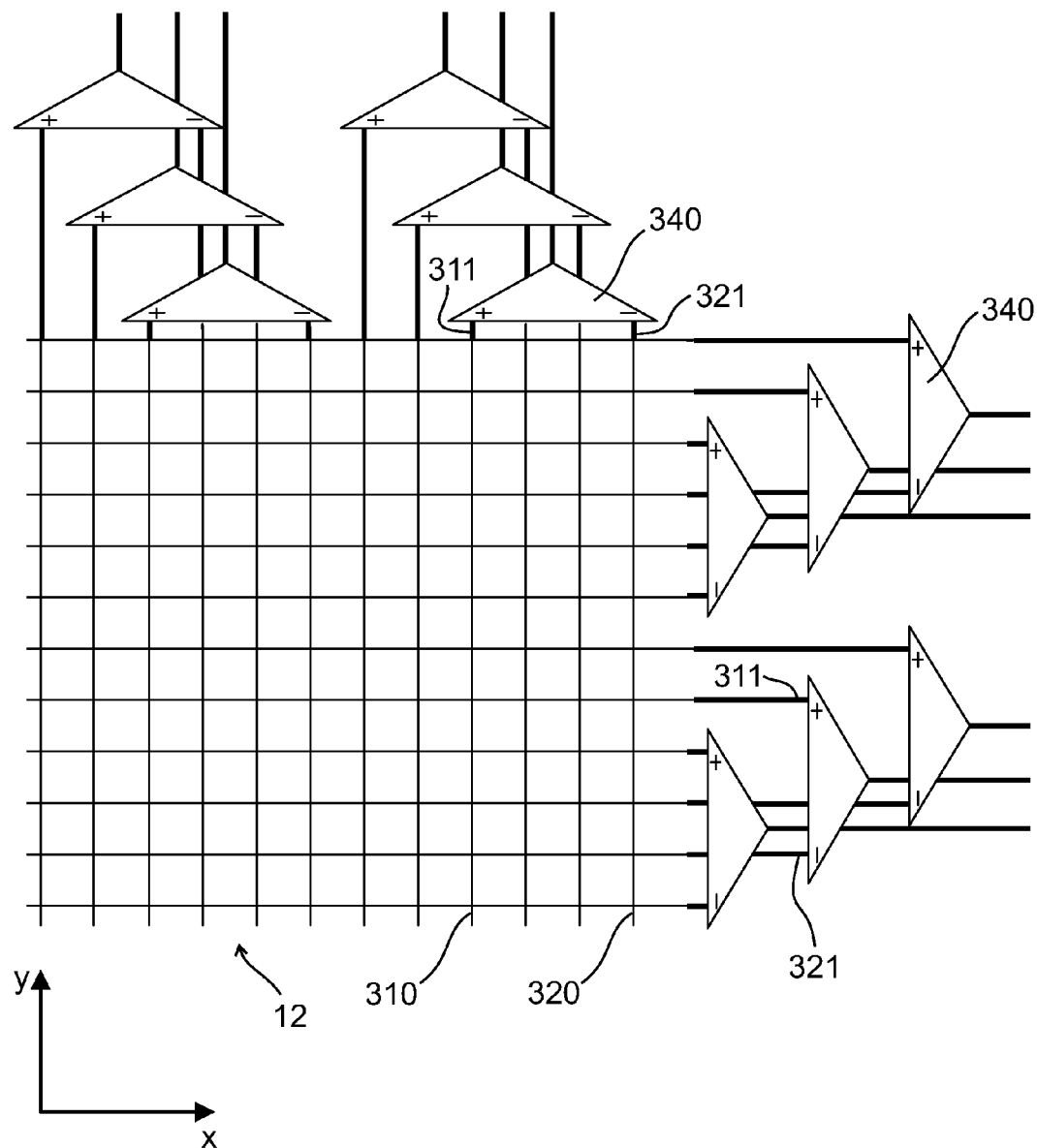
FIG. 4 is a simplified circuit diagram of an exemplary digitizer sensor including differential amplifiers for use with some embodiments of the present invention.

Reference is now made to FIG. 4 showing an array of conductive lines of the digitizer sensor as input to differential amplifiers according to some embodiments of the present invention. According to some embodiments of the present invention, two parallel sensor lines, e.g. lines 310 and 320 that are close but not adjacent to one another are connected respectively to the positive input 311 and negative input 321 of a differential amplifier 340. Amplifier 340 is thus able to generate an output signal which is an amplification of the difference between the two sensor line signals. An amplifier having a stylus on one of its two sensor lines will produce a relatively high amplitude output. Typically output is detected on sensor lines in both the X and Y direction to locate the coordinates of a stylus interacting with sensor 12. In some exemplary embodiments, a single input amplifier is implemented and difference signal is determined by software embedded in digital unit 20. It is noted that although determining the difference signal by software may provide more versatility it may also limit the dynamic range of the signal that can be sampled. Optionally the stylus detection is done in single ended mode.

In some exemplary embodiments, output on sensor lines in both the X and Y direction are sampled every 6-9 msec, e.g. 7.5 msec defining a refresh cycle of the digitizer. In some exemplary embodiments, during each refresh cycle, sensor lines are sampled at a sampling frequency of 100 KHz during a defined chunk sampling period, e.g. 2-4 msec and/or 3.84 msec. Optionally, a 200 KHz sampling period is used. Stylus detection is described with further details, for example in incorporated U.S. Pat. No. 7,292,229. It is noted that the differential setup described in reference to FIG. 4 can be applied for stylus detection only, simultaneous finger touch detection and stylus detection. Optionally, the differential setup described in reference to FIG. 4 can be adapted to multi-touch detection as well.

Finger Touch Detection—Single Touch Detection Method

Figure 5:
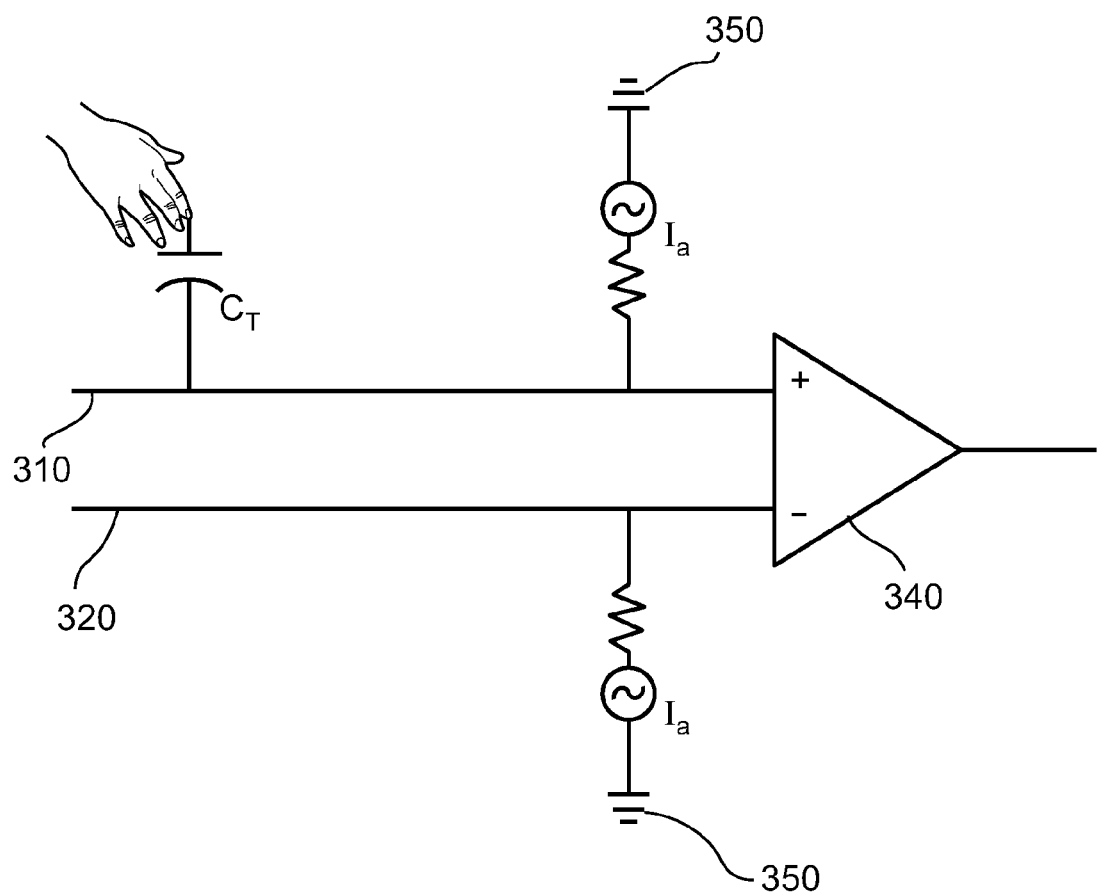
FIG. 5 is a simplified circuit diagram for exemplary touch detection based on a single touch detection method for use with some embodiments of the present invention.

Reference is now made to FIG. 5 showing an exemplary simplified circuit diagram for touch detection based on a single touch detection method for use with some embodiments of the present invention. Conductive lines 310 and 320 are parallel non-adjacent lines of sensor 12. According to some embodiments of the present invention, conductive lines 310 and 320 are interrogated to determine if there is a finger input signal derived from finger touch and/or finger hovering. To query the pair of conductive lines, a signal source $I_a$, e.g. an AC signal source induces an oscillating signal in the pair. Signals are referenced to a common ground 350. When a finger is placed on one of the conductive lines of the pair, a capacitance, $C_T$, develops between the finger (either touching or hovering over the digitizer) and conductive line 310. As there is a potential between the conductive line 310 and the user's finger, current passes from the conductive line 310 through the finger to ground. Consequently a potential difference is created between conductive line 310 and its pair 320, both of which serve as input to differential amplifier 340.

Separation between the two conductive lines 310 and 320 is typically greater than the width of the finger so that the necessary potential difference can be formed, e.g. approximately 12 mm. Typically a finger touch on the sensor may span 2-8 lines, e.g. 6 conductive lines. Typically, the finger hovers over and/or touches the digitizer over a number of conductive lines so as to generate an output signal in more than one differential amplifier, e.g. a plurality of differential amplifiers. However, a finger touch may be detected when placed over one conductive line. Typically a finger hovering at a height of about 1 cm-2 cm above the digitizer can be detected. The differential amplifier 340 amplifies the potential difference developed between conductive lines 310 and 320. ASIC 16 and digital unit 20 process the amplified signal and determine the location and/or position of the user's finger based on the amplitude and/or signal level of the sensed signal. Although only one pair of conductive lines are shown, it is noted that touch is typically detected based on a plurality of outputs from differential amplifiers with input obtained from interleaving conductive lines.

In one example, the origin of the user's finger from the two inputs of the differential amplifier is determined by examining the phase of the output. In another example, since a finger touch typically produces output in more than one conductive line, the origin of the user's finger from the two inputs of the differential amplifier is determined by examining outputs of neighboring amplifiers and optionally interpolation is used to find a more accurate value. In yet other examples, a combination of both methods may be implemented. According to some embodiments of the present invention, stylus interaction can be detected concurrently with finger touch using this detection method. Typically, the stylus transmits at a frequency other than the frequency used for finger detection so that finger and stylus detection can be differentiated. Typically, all sensor lines are interrogated simultaneously and based on sampled outputs on both an X and Y axis of the digitizer, coordinates of detected user interaction (finger and/or stylus) are determined. Typically, a refresh cycle of finger detection is the same as that used for stylus detection during tip mode of the stylus.

According to some embodiments of the present invention, this method of touch detection which is described with further details in, for example incorporated U.S. Pat. No. 7,372,455 is implemented for single touch detection.

Autonomous Asynchronous Stylus Detection

Figure 6:
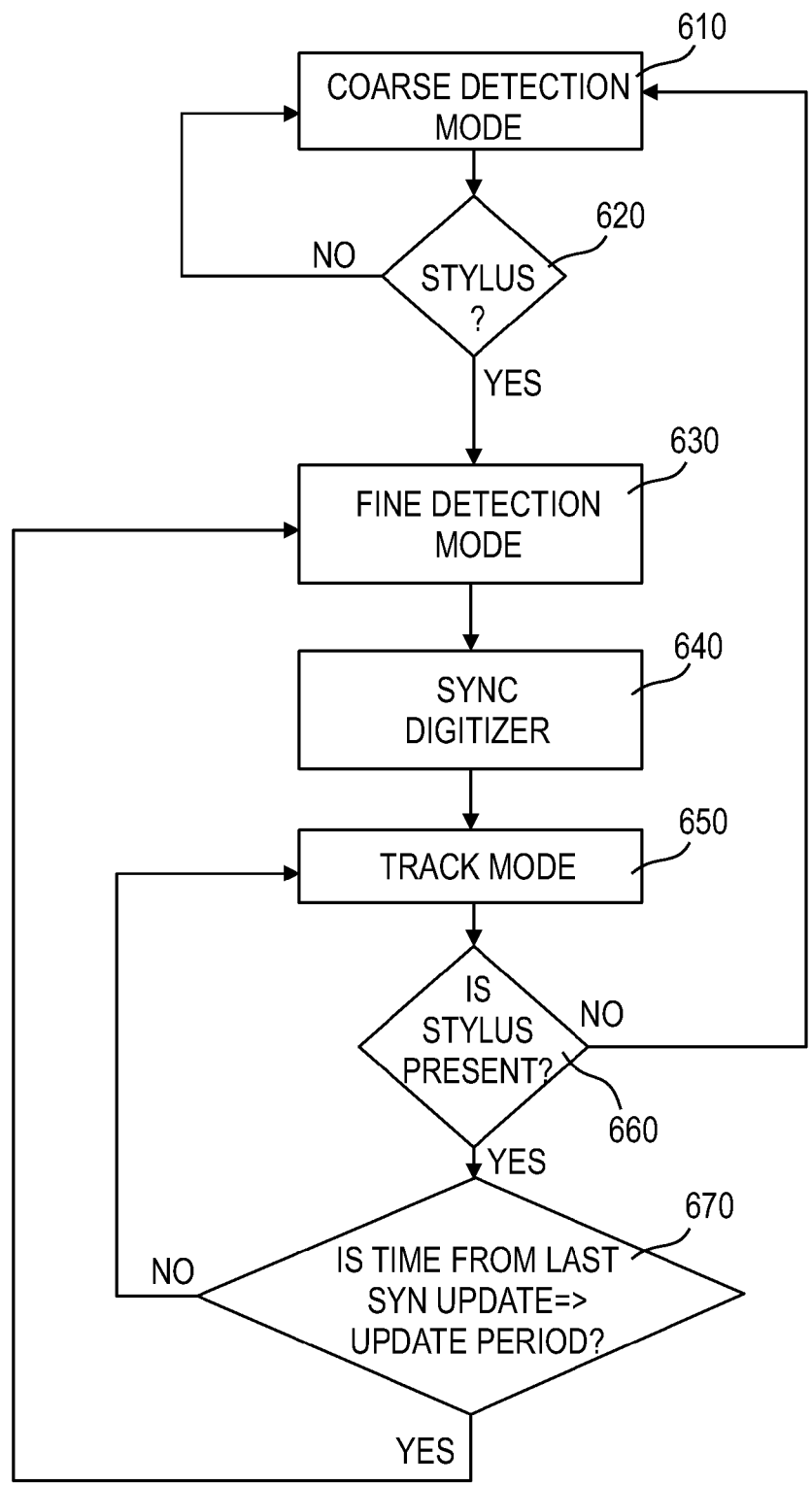
FIG. 6 is a flow chart describing an exemplary method for detecting pulses received by an autonomous asynchronous signal transmitting stylus in accordance with some embodiments of the present invention.

Reference is now made to FIG. 6 showing a flow chart describing an exemplary method for detecting pulses received by an autonomous asynchronous signal transmitting stylus in accordance with some embodiments of the present invention. According to some embodiments of the present invention, at start-up or prior to detection of a transmitting stylus, a coarse detection mode for searching for a transmitting stylus is defined and applied by digital unit 20 of digitizer system 100 (block 610). According to some embodiments of the present invention, during course detection mode, periods for sampling, e.g. chunk sampling periods, are staggered over different portions of a refresh cycle to cover an entire transmission period of a stylus over a few refresh cycles. Typically, characteristics of the expected transmission pulse, e.g. frequency of AC signal burst, duration, a time between pulses is known and stored by the digitizer, e.g. pre-determined. In some exemplary embodiments, a duration of each chunk sampling period is at least 3 times a duration of an expected transmission pulse of stylus 44, e.g. 3 times 1.28 msec (3.84 msec). Optionally, a time between pulses is known to alter based on an operation mode of the stylus, e.g. between once every refresh cycle of the digitizer or once every other refresh cycle of the digitizer.

According to some embodiments of the present invention, coarse detection for stylus 44 continues while a transmission pulse of stylus 44 is not detected (block 620). In some exemplary embodiments, during coarse detection DFT windows (in stylus AC burst signal frequency) are run in relative large steps, e.g. ¼ a width of an expected transmission pulse, to identify a stylus signal within one of the chunk sampling periods. Typically, during coarse detection, DFT windows are run on outputs obtained from all amplifiers 340 as the stylus position is unknown.

Once a stylus is detected in one of the chunk sampling periods, digitizer 100 enters a fine detection mode (630) to determine start of the received transmission with finer accuracy and synchronize the chunk sampling periods with determined timings of the stylus' beacon pulse 110. Typically, since fine tuning may require heavy processing, fine detection is performed from output sampled on one or a few, e.g. 1-4, selected sensor line on which the stylus was detected and not on all the sensor lines. In some exemplary embodiments, DFT windows (in stylus AC burst signal frequency) that are stepped with relatively small steps are used, e.g. 1/32 a width of an expected transmission pulse to detect an onset of the received stylus signal. In some exemplary embodiments, during fine detection, timing of a received pulse can be identified with an accuracy of about 0.02 msec and/or about 1/64 a width of an expected transmission pulse.

According to some embodiments of the present invention, timing of chunk sampling periods of the digitizer are synchronized with identified timing of received stylus pulses (block 640) and the digitizer operates in track mode (block 650). Synchronization is locked once fine detection is completed (block 640) and is updated and/or adjusted as required and/or periodically when fine detection is repeated. Typically during track mode (and find detection mode), the digitizer is sampled during one chunk sampling period of between 2-4 msec during each refresh cycle, e.g. at the start of each refresh cycle.

Typically, track mode (position reporting of the stylus) is activated once a stylus is detected (block 620) and fine detection (block 630) and synchronization (block 640) is performed in parallel with track mode (block 650). In some exemplary embodiments, finger touch detection is desired and/ore required, conductive lines of sensor 12 are triggered at the start of each chunk sampling period and triggering continues throughout the chunk sampling period.

Over the course of tracking, if the stylus signal is lost, e.g. not present over a pre-defined period of time (block 660), synchronization is lost and the digitizer reverts back to coarse mode detection (block 610).

According to some embodiments of the present invention, during track mode, synchronization is updated periodically with fine tune detection (block 670). Typically, updating is required to compensate for cumulative errors due to limited accuracy in determining timing of received stylus pulse as well as due to drift between stylus and digitizer clocks.

It is noted that, finger detection, e.g. based on a single touch detection mode may be supported during stylus search and tracking and is typically unaffected during coarse and fine detection mode and proceeds at a steady refresh rate. Typically, while the digitizer is synchronized with stylus transmission period, timing for finger detection is also synchronized with stylus detection. In some exemplary embodiments, conductive lines of sensor 12 are triggered at the start of each chunk sampling period once synchronization is established and triggering continues throughout the chunk sampling period.

Figure 7A:
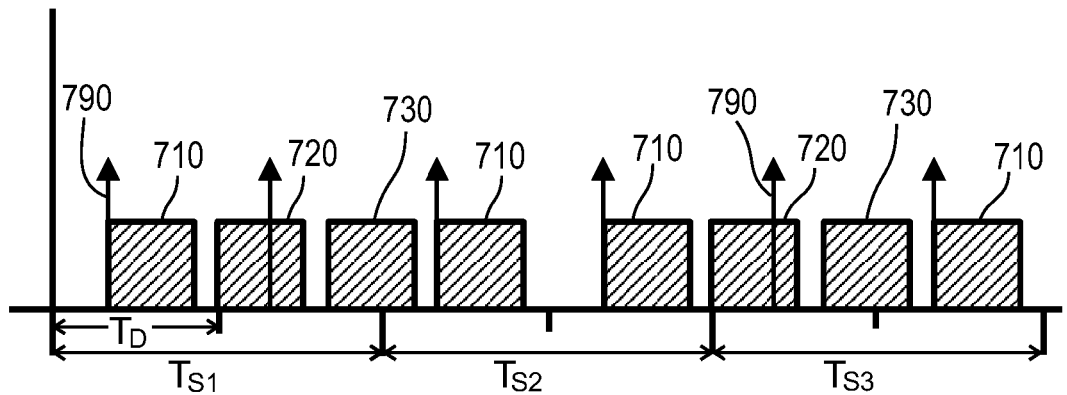
FIGS. 7A-7B is a simplified time line showing exemplary chunk sampling periods used during coarse detection in accordance with some embodiments of the present invention.
Figure 7B:
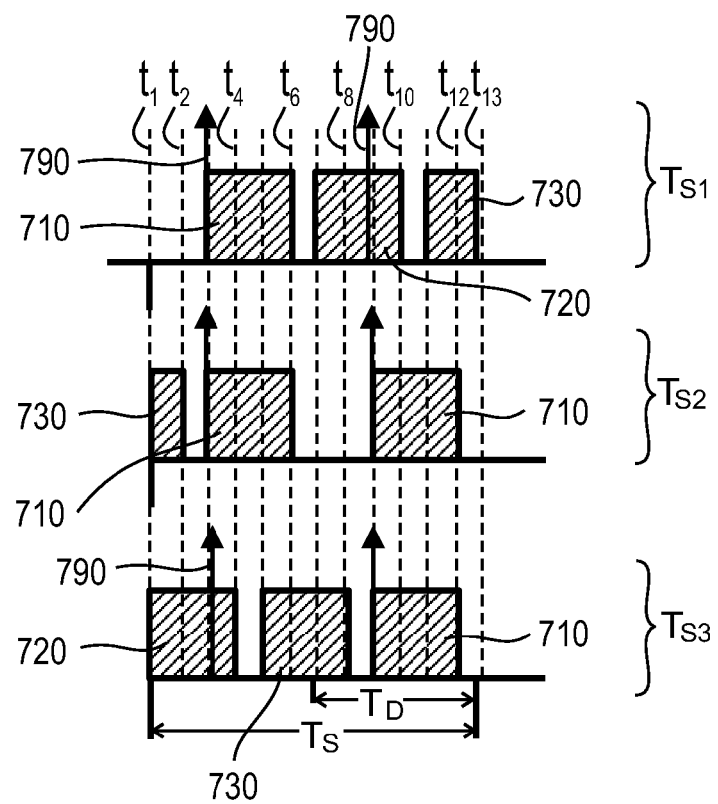

Reference is now made to FIGS. 7A and 7B showing a simplified exemplary time line of exemplary chunk sampling periods used during coarse detection in accordance with some embodiments of the present invention. In some exemplary embodiments, three chunk sampling periods 710, 720 and 730 are staggered over three or more transmission periods $T_S$ of a transmitting stylus in the following repeatable pattern {710, 720, 730, 710, 710, 720, 730}. Typically, all chunk sampling periods have a common duration that is at least three times a width of an expected transmitting pulse of a stylus. Typically, each of chuck sampling periods 710, 720, and 730 are differentiated by their positioning within a refresh period of the digitizer $T_D$. For example chunk sampling period 710 is initiated at a pre-defined time after an onset of $T_D$, chunk sampling period 720 is initiated at the onset of $T_D$, and chunk sampling period 730 is initiated toward the end of $T_D$ and extends over to the next $T_D$. According to some embodiments of the present invention, finger touch position (790) is reported to the host computer during each digitizer refresh cycle and coinciding with a chunk sampling period so that finger tip detection is maintained at a constant refresh rate. Typically, triggering of the sensor lines for finger tip detection is applied over an entire duration of each chunk sampling period to avoid errors in stylus energy measurement due to partial of the triggering signal.

According to some embodiments of the present invention, for a system where the stylus transmits once every other refresh cycle of the digitizer, one full transmission period of the stylus $T_S$ (time between pulses) is fully covered over a period equally three $T_S$. During this period (3 time $T_S$), at least one of the chunk sampling periods will catch a full width of a transmission pulse of a stylus transmitted once over $T_S$. According to some embodiments of the present invention, it is desirable to detect a full transmission pulse in at least one chunk sampling period to improve the signal to noise ratio as opposed to parts of the transmission burst signal over different chunk sampling periods.

According to some embodiments of the present invention, the staggered pattern shown in FIG. 7A provides for overlapping of the chunk sampling periods over a width of the pulse transmitted by the stylus, e.g. 1.28 msec. In FIG. 7B chunk sampling periods over the three stylus transmission cycles ($T_{S1}$, $T_{S2}$, $T_{S3}$) are shown one over the other so that overlapping between the chunk sampling periods can more clearly be seen. Chunk sampling period 730 is divided over the upper two time lines in FIG. 7B since it extends over stylus transmission cycle $T_{S1}$ and $T_{S2}$.

A width between each of the dotted lines ($t_1$, $t_2$, ... $t_{13}$) constitute a width of an expected transmission pulse received from a stylus, e.g. 1.28 msec for a digitizer refresh rate of 7.5 msec. For example if a stylus pulse appears between $t_2$ and $t_4$, a full width of the stylus pulse can be detected during $T_{S3}$ in chunk sampling period 720. In another example, if a stylus appears between $t_{10}$ and $t_{12}$, a full width of the stylus pulse can be detected during $T_{S2}$ in chunk sampling period 710.

According to some embodiments of the present invention, a same or similar repeatable pattern (710, 720, 730, 710, 710, 720, 730) can be used to detect a stylus signal occurring at a lower rate than once every other refresh cycle of the digitizer. Typically, more than three transmission periods of the stylus will be required for stylus pulse detection in such a case.

Figure 8A:
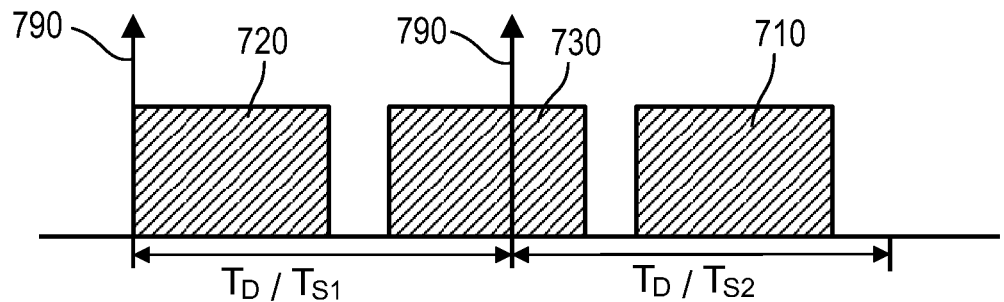
FIGS. 8A-8B is a simplified time line showing exemplary chunk sampling periods used during coarse detection for a stylus that transmits pulses at a same rate as a refresh rate of a receiving digitizer in accordance with some embodiments of the present invention.
Figure 8B:
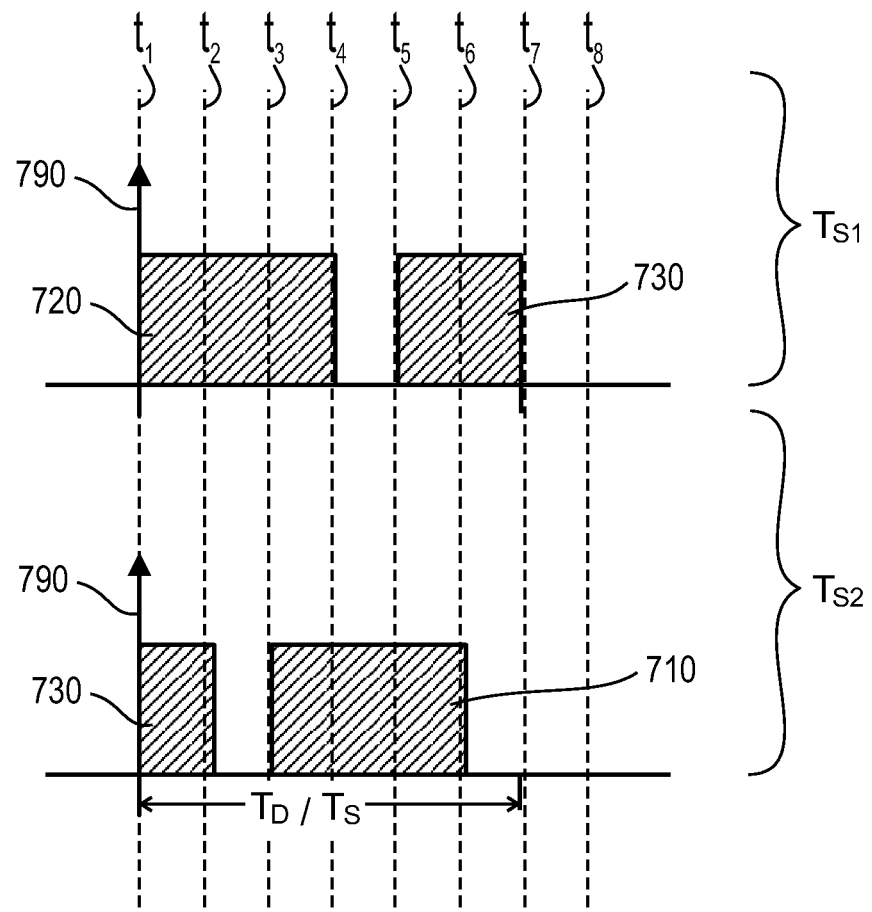

Reference is now made to FIGS. 8A and 8B showing a simplified exemplary time line of exemplary chunk sampling periods used during coarse detection for a stylus that transmits pulses at a same rate as a refresh rate of a receiving digitizer in accordance with some embodiments of the present invention. According to some embodiments of the present invention, when the stylus transmits at a same frequency as the refresh frequency of a digitizer a simpler coarse detection pattern is used to detect an appearance of a stylus signal. According to some embodiments of the present invention, a stylus is detected by similar principles as described in reference to FIGS. 7A and 7B but over 1-2 transmission periods of the stylus. According to some embodiments of the present invention, a pattern of detection used includes chunk sampling periods (720, 730 and 710) staggered over two transmission periods of the stylus. Overlapping, of at least a width of the stylus pulse is similarly provided as described in reference to FIGS. 7A and 7B. For example when a stylus pulse appears between t3 and t5 it can be fully detected during $T_{S2}$ in chunk sampling period 730. In another example, when a stylus pulse appears between t1 and t3 it can be fully detected during $T_{S1}$ in chunk sampling period 710.

According to some embodiments of the present invention, a filter, e.g. a DFT filter tuned to an AC frequency of the beacon pulse (signal burst) and that has a same and or substantially the same width as a beacon pulse of a stylus is run in each chunk to identify a chunk including a full beacon pulse of the stylus. Optionally, the filter is applied in steps of ¼ of the width of the beacon signal. Steps of ¼ of the width of the beacon signal provide for at least detecting 87.5% of the transmitted signal.

According to some embodiments of the present invention, during fine tuning is performed during a subsequent refresh cycle(s) of the digitizer after a stylus has been detected in coarse search mode. Typically, all sensor lines are sampled to supply position information on any finger interacting with the digitizer as well as the detected stylus. According to some embodiments of the present invention, a filter is passed in steps of 1/32 of the width of beacon pulse 110, e.g. 4 samples at 100 KHz sampling frequency, on the sampled data starting from a time point in the chunk sampling period just prior to where the stylus was detected, e.g. in the coarse mode detection. In some exemplary embodiments, filtering is initiated 0.32 msec before the point of detection in the previous refresh cycle where the stylus was detected. Since the strongest window in coarse detection may only capture 87.5% of the signal, e.g. 112 samples at a 100 KHz sampling rate, filtering for fine tuning should begin 16 samples prior to the strongest window found. However, to provide noise immunity filtering may begin at 32 samples prior to detection of the strongest window. Typically, fine tuning is performed on selected lines where the stylus was detected, e.g. the sensor line outputting the strongest stylus signal and based on outputs received from those lines, timing of the stylus pulse is determined and used for synchronization.

Figure 9:
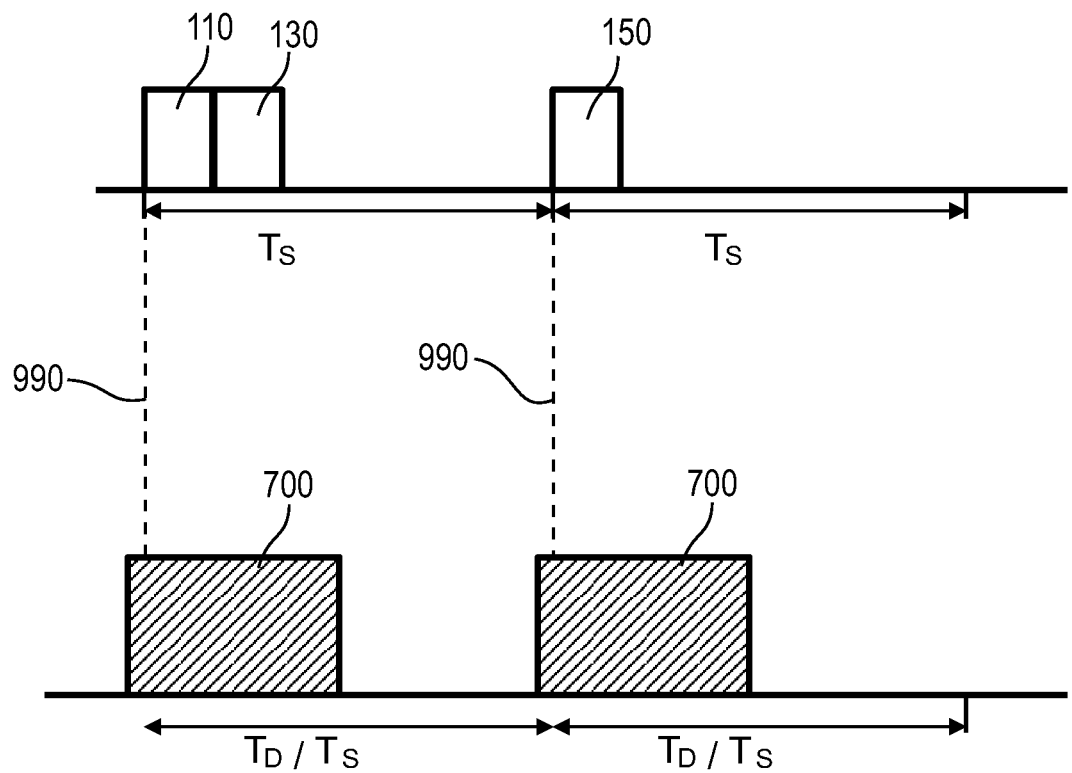
FIG. 9 is a simplified time line showing exemplary chunk sampling periods of a digitizer after synchronization with a detected stylus in accordance with some embodiments of the present invention.

Reference is now made to FIG. 9 showing a simplified exemplary time line of an exemplary chunk sampling periods of a digitizer after synchronization with a detected stylus in accordance with some embodiments of the present invention. According to some embodiments of the present invention, a chunk sampling period 700 of a digitizer is defined to begin a pre-defined period before a stylus beacon pulse 110 and/or pressure pulse 150 is expected based on a previous time detection of stylus beacon pulse. In some exemplary embodiments, if stylus pulse 110 is expected at time 990, a chunk sampling period is initiated just before it is expected, e.g. 0.32 msec and is extended after the expected stylus pulse ends. In some exemplary embodiments, initiating chunk sampling period 700 before stylus pulse 110 is expected allows for fine tuning of start of reception based on received input. It is noted that finger reporting 790 doesn't necessarily synchronized with a beginning of a refresh cycle ($T_D$) as shown in FIGS. 7A, 7B, 8A, 8B and 9.

Multi-Touch Detection Method

Figure 10:
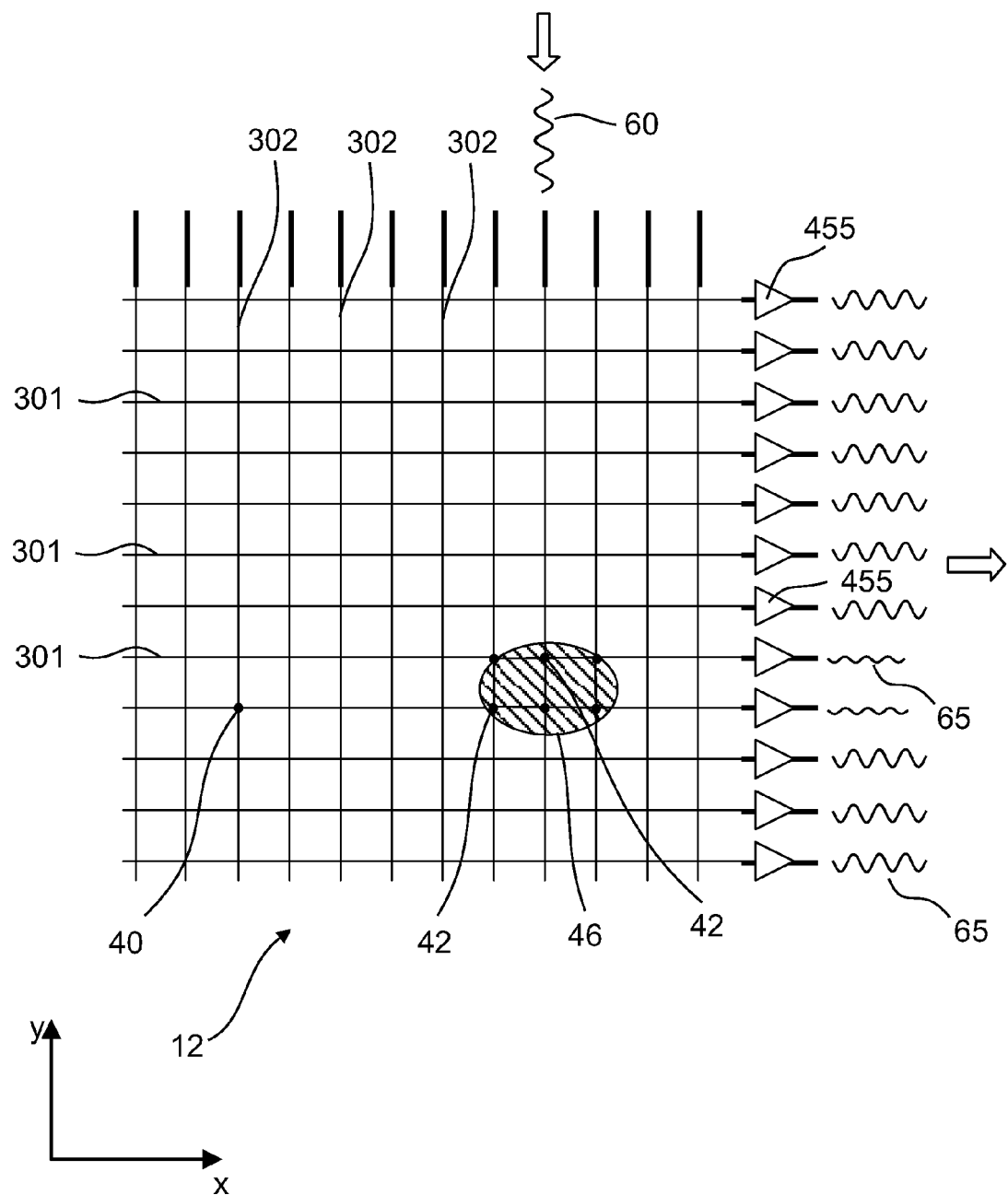
FIG. 10 is a simplified circuit diagram for touch detection based on a multi-touch detection method for use with some embodiments of the present invention.

Reference is now made to FIG. 10 showing an exemplary simplified circuit diagrams for touch detection based on a multi-touch detection method for use with some embodiments of the present invention.

According to some embodiments of the present invention, detection of a finger in multi-touch detection is a capacitive-based detection method. At each junction, e.g. junction 40 in sensor 12 a certain minimal amount of capacitance exists between orthogonal conductive lines. When a finger 46 touches (or hovers over) the sensor, the capacitance formed in junctions 42 within the vicinity of finger 46 typically increases since the finger typically drains current from the lines to ground.

According to some embodiments of the present invention, the change in capacitance at one or more junctions 42 is detected by triggering one or more parallel conductive lines, e.g. active line(s) 302 of sensor 12 with an AC signal 60 and detecting signals 65 crossing by virtue of the capacitance to crossing lines, e.g. passive lines 301 orthogonal to triggered line 302. Typically, the presence of a finger decreases the amplitude of the coupled signal by 5-15% or 15-30% and thereby can be detected.

According to some embodiments of the present invention, the procedure for detection includes triggering each conductive line along one axis of the sensor, e.g. each active line 302, one line at a time, and while triggering, signals are sampled, e.g. simultaneously in all lines crossing that triggered line, e.g. all lines of the orthogonal axis (passive lines 301). This triggering and detecting procedure is repeated until all the lines in the active axis have been triggered and interaction in all junction points has been detected.

This multi-touch detection method constructs two dimensional images that indicate positions of a plurality of fingers (and conductive objects) concurrently interacting with sensor 12. Typically, such an image indicates on which junction an interaction, e.g. a touch is present.

Optionally, multi-touch detection is provided in specified pre-defined areas of sensor 12 and only the active line and passive lines crossing the pre-defined areas are triggered and sampled. In some exemplary embodiments, multi-touch detection provides for simultaneously trigger more than one line with different frequencies and/or phase as is described in more detail in incorporated US Patent Publication No. 20070062852 and US Patent Application Publication No. 20090127005, entitled "System and method for detection with a digitizer sensor" which is assigned to N-trig Ltd., the contents of which is incorporated herein by reference.

According to some embodiments of the present invention, each conductive line of the passive axis is input to an amplifier. In some exemplary embodiments, the amplifier is a single ended amplifier 445 (FIG. 10).

According to some embodiments of the present invention an independent asynchronous stylus is detected during scanning of a digitizer based on a multi-touch detection method as described in reference to FIG. 10. Typically during digitizer scanning, e.g. for multi-touch detection only one axis is sampled while the other is triggered. Although output from only one axis may reduce the accuracy of detecting an onset of a stylus transmitting pulse, the present inventors have found that the accuracy permitted is adequate for at least a coarse detection of an appearance of stylus pulse. Optionally, once fine detection mode is activated, the digitizer switches to single touch mode and/or samples outputs from both the triggering and detection axis of the digitizer. Optionally, once a stylus signal is determined to be lost, multi-touch detection is reinitiated.

Figure 14:
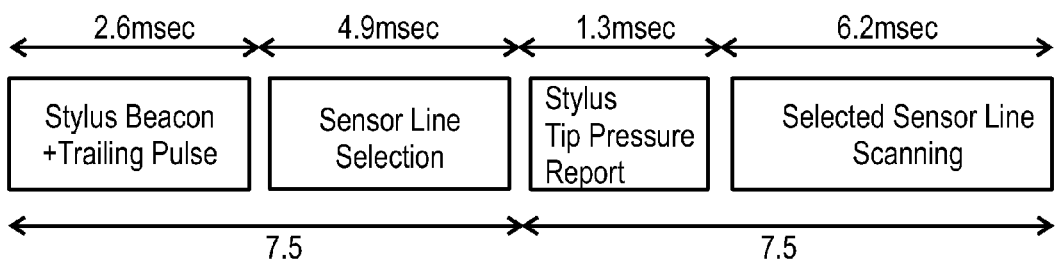
FIG. 14 is a simplified exemplary time line for supporting multi-touch detection with detection of an autonomous asynchronous stylus after synchronization in accordance with some embodiments of the present invention.

Alternatively, multi-touch detection is supported throughout stylus detection and tracking, for example, as described in more detail in reference to FIG. 14. In some exemplary embodiments, to support stylus detection and tracking together with multi-touch, during line sampling periods, the output from the triggered axis including triggered lines 302 is sampled as well as the output from the passive axis including passive lines 301. Typically, the gain of the triggered lines is adjusted to avoid saturation when detecting stylus pulsed signals on lines transmitting a triggering signal.

Typically, during scanning of the digitizer sensor, e.g. for multi-touch detection a plurality of line sampling periods are spread over a substantially entire period of each refresh cycle, e.g. each line sampling period. This is due to repeated sampling of the lines on one axis of the grid for each of a line on the orthogonal axis. A line sampling period is a chunk sampling period over which sensor lines from one axis of the digitizer are sampled in response to triggering of a sensor line on the other axis of the digitizer. Typically, each line sampling periods is devoted to sampling outputs on one axis due to a single triggering event of the other axis. The number of line sampling periods, typically equal the number of triggering periods. In some exemplary embodiments, each line sampling period lasts for 0.32 msec or 0.64 msec. According to some embodiments of the present invention, a stylus transmission signal, e.g. a beacon signal having width 1.28 msec can be detected on more than one line sampling period of stylus scanning, e.g. typically over two line sampling periods. According to some embodiments of the present invention, as long as there is no sampling hole greater than a pre-defined fraction, e.g. ½ of a width of the stylus transmitting pulse, the pulse will overlap with at least one full sampling window and the stylus can be detected immediately.

In some exemplary embodiments, a signal to noise ratio of a detection signal can be improved by artificially combining detected signals from two consecutive line sampling periods into one continuous signal before determining an amplitude level of the signal. In order to combine the two signals, a phase shift due to a break in time between the two consecutive line sampling periods needs to be taken into account. The phase angle between the two detected signals is defined by a period of the time break and the frequency of the beacon pulse 110 and one of the detected signal outputs is shifted by the defined rotation. Once combined, output level of the combined signal can be used to determine detection of a stylus pulse.

Multi-Touch Detection Scanning with Differential Setup

Figure 11A:
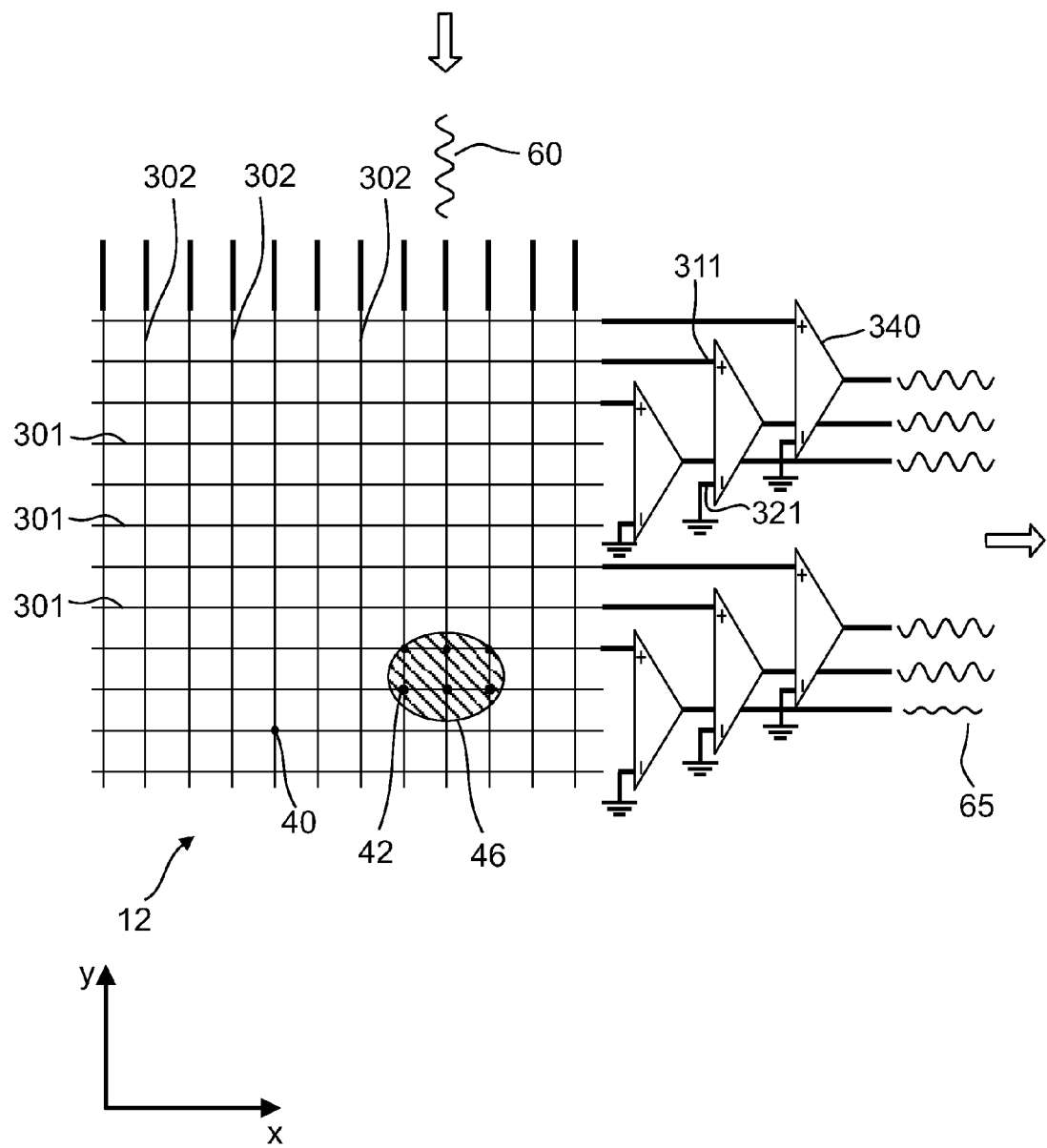
FIGS. 11A and 11B are simplified circuit diagrams for exemplary touch detection based on a multi-touch detection method with differential amplifiers for use with some embodiments of the present invention.
Figure 11B:
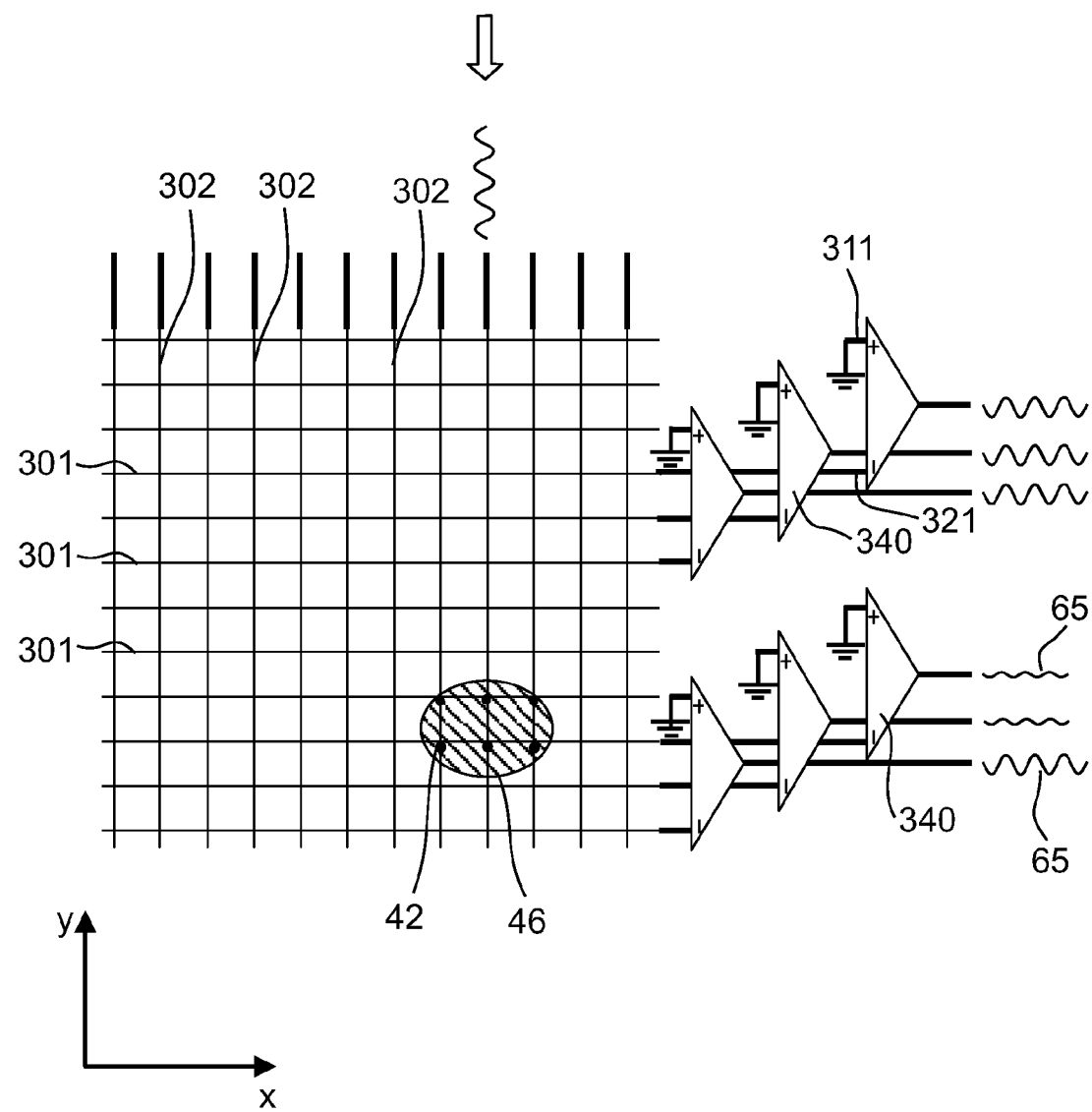

Reference is now made to FIGS. 11A and 11B showing exemplary simplified circuit diagrams for touch detection based on a multi-touch detection method with differential amplifiers for use with some embodiments of the present invention. In some exemplary embodiments, the amplifier is a differential amplifier 340 where one input to differential amplifier 340 is ground. According to some embodiments of the present invention, when one of the inputs to the differential amplifier is ground, each triggering event of an active line 302 provides for sampling only half of the passive lines 301. According to some embodiments of the present invention, connection to ground is toggled between each of the inputs (positive and negative) of differential amplifier 340 so that all lines of the sensor lines can be detected. In some exemplary embodiments an active line 302 is triggered once to detect all positive inputs to the differential amplifiers 340 (FIG. 11A) connection to ground is then toggled and the same active lines is triggered again so that all negative inputs to the differential amplifiers 340 are detected (FIG. 11B).

It is noted that although in FIGS. 10 and 11A and 11B one axis is shown as the active axis and the other axis is shown as the passive axis, either one of the axes can serve as the active or passive axis. Furthermore, it is noted that the active and passive axes can be dynamically switched by ASIC 16 together with digital unit 20.

According to some embodiments of the present invention, during each sweep only half the conductive lines are sampled and the resolution in the sampling axis is thereby reduced. In some exemplary embodiments, a first half of the lines, e.g. every other line, are sampled over one refresh cycle, and a second half of the lines are sampled in a subsequent refresh cycle. However, it is noted that although the resolution in this case is compromised, refresh rate is increased.

According to some embodiments of the present invention, stylus detection is provided concurrently with finger touch (or conductive object) detection. Typically, a frequency output of the stylus signal is other than the frequency used for finger detection, e.g. with an orthogonal frequency or a frequency far enough away from a finger detection frequency so that finger and stylus detection can be differentiated. According to some embodiments of the present invention, output from both the passive and active lines is detected, e.g. via amplifiers so that stylus interaction can be detected concurrently with finger interaction.

Figure 11C:
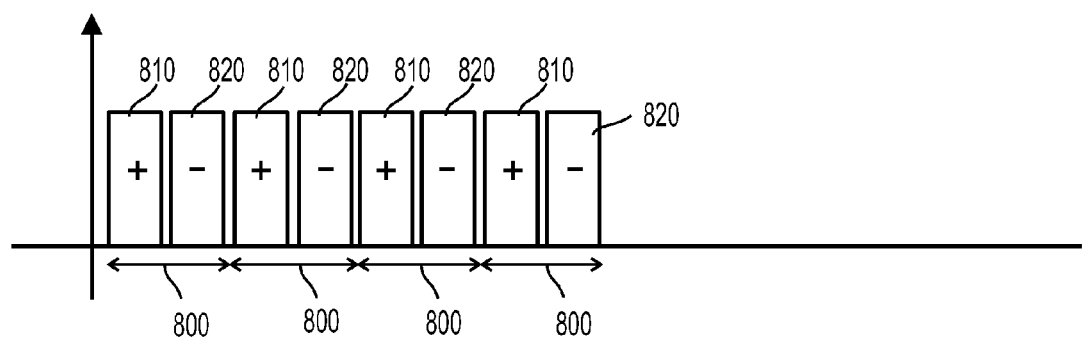
FIG. 11C is a time line showing exemplary chunk sampling periods for multi-touch detection method with differential amplifiers for use with some embodiments of the present invention.

Reference is now made to FIG. 11C showing an exemplary time line showing exemplary line sampling periods for multi-touch detection method with differential amplifiers for use with some embodiments of the present invention. According to some embodiments of the present invention, in response to triggering of sensor line on a digitizer a line over a duration 800, sampling period 810 is used to sample a first half of the sensor lines, e.g. sensor lines 301 connected for example to a positive input to a set of differential amplifiers. Subsequently while the same line is triggered over duration 800 a second line sampling period 820 samples a second half of the sensor lines connected for example to a negative input to the set of differential amplifiers. Subsequently, a next line is triggered, and sampling of the positive and negative inputs of the differential amplifier is repeated. This process is continued until all the lines on one axis are scanned, e.g. all the lines designated for multi-touch are scanned. Exemplary line sampling periods for scanning 4 lines is shown in FIG. 11C. Multi-touch detection is described with further details, for example in incorporated U.S. Pat. No. 7,372,455 and US Patent Publication No. 20070062852 and US Patent Publication No. 20090127005. Additionally, further details regarding multi-touch detection is described in US Patent Publication No. 20090251434 entitled "Multi-Touch and Single Touch Detection" assigned to N-Trig Ltd., and the contents of which is incorporated herein by reference.

As can be appreciated by the persons skilled in the art, the single touch detection methods described in reference to FIGS. 4-5 is inherently faster and more economical in terms of processing as compared to the multi-touch detection methods described in reference to FIGS. 10, 11A-11B that requires sequential scanning of the conductive lines, e.g. the passive lines.

Shortened Method for Multi-Touch

According to an aspect of some embodiments of the present invention there is provided a multi-touch sensitive computing system and method that provides for identifying portions of the multi-touch sensitive sensor that requires scanning to detect multi-touch positions of user interactions. According to some embodiments of the present invention, portions of a sensor affected by user interaction are first identified prior to scanning and once identified only the lines associated with the identified portion are scanned.

Figure 12C:
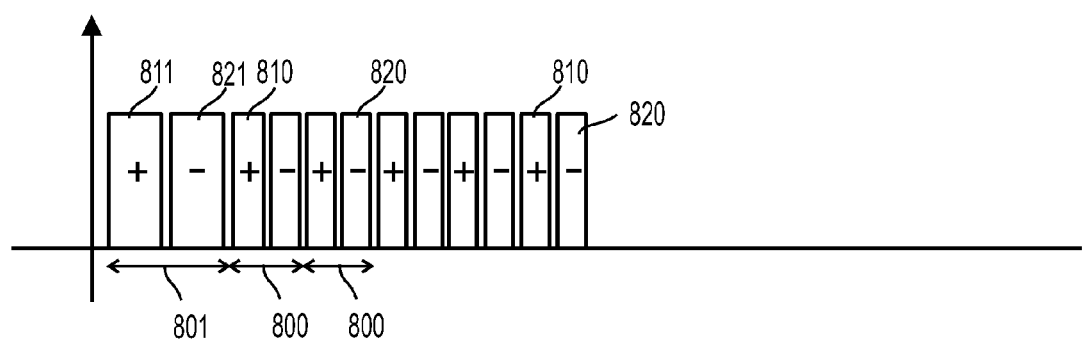
FIG. 12C is an exemplary time line of exemplary chunk sampling periods for a shortened method for multi-touch detection method with differential amplifiers for use with some embodiments of the present invention.
Figure 12A:
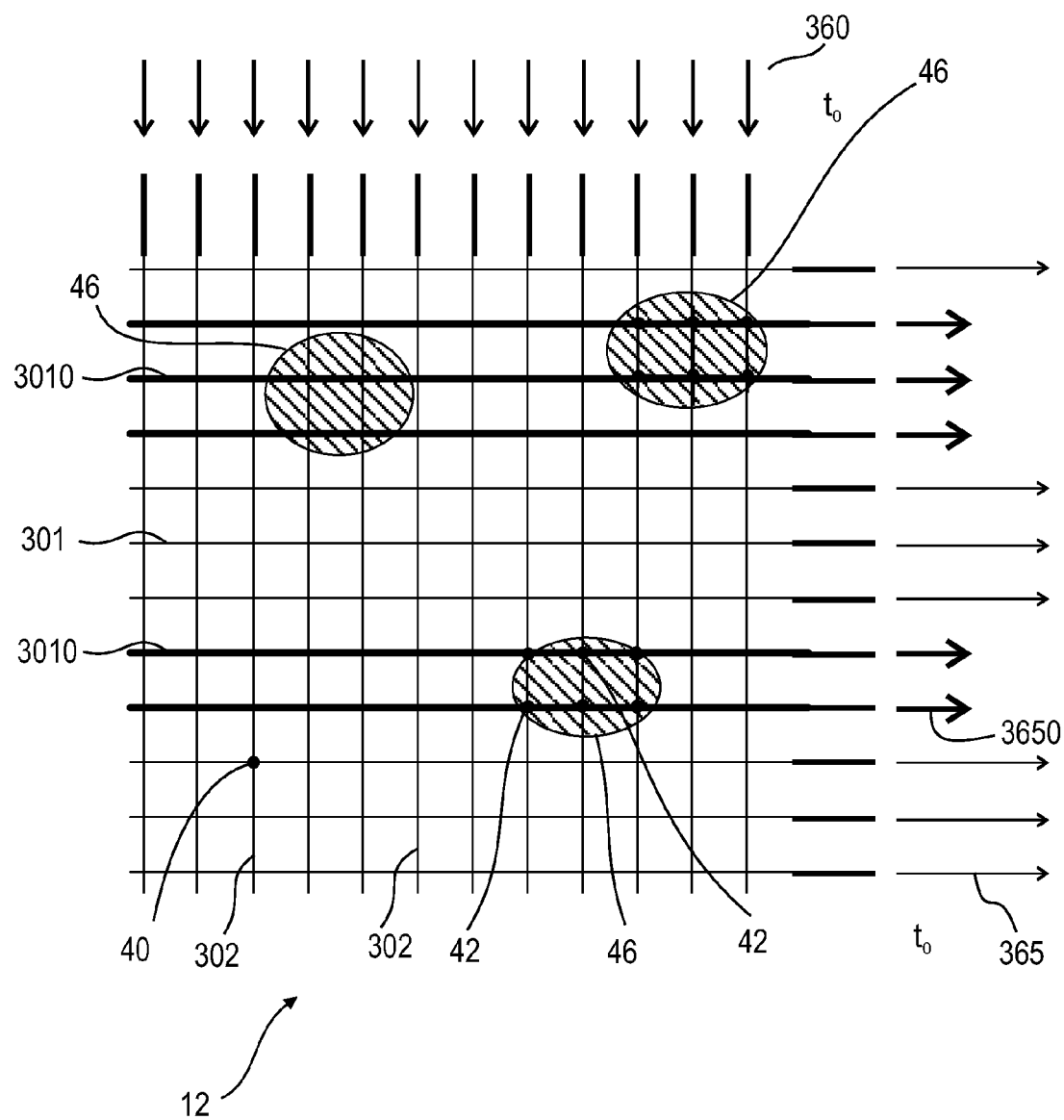
FIG. 12A is a schematic illustration of digitizer sensor outputs along a second axis of a digitizer sensor in response to simultaneously triggering sensor lines along a first axis used to identify interacting lines of the sensor along the second axis in accordance with some embodiments of the present invention.

Reference is now made to FIG. 12A showing a schematic illustration of digitizer sensor outputs along a second axis of a digitizer sensor in response to simultaneously triggering sensor lines along a first axis used to identify interacting lines of the sensor along the second axis in accordance with some embodiments of the present invention. According to some embodiments of the present invention, to identify interacting lines 3010 prior to scanning, a group of sensor lines 302, e.g. all sensor lines 302 are triggered simultaneously with an AC triggering signal 360. Optionally, sensor lines 302 are divided into groups, and lines from each group are triggered simultaneously with indistinguishable (or same) signals. In response to the simultaneous triggering, outputs from cross lines 301 are sampled and amplitudes of the output signals are examined to identify interacting lines 3010 among cross lines 301. Outputs with the strongest signals, e.g. signal over a predefined amplitude are singled out as interacting lines.

Figure 12B:
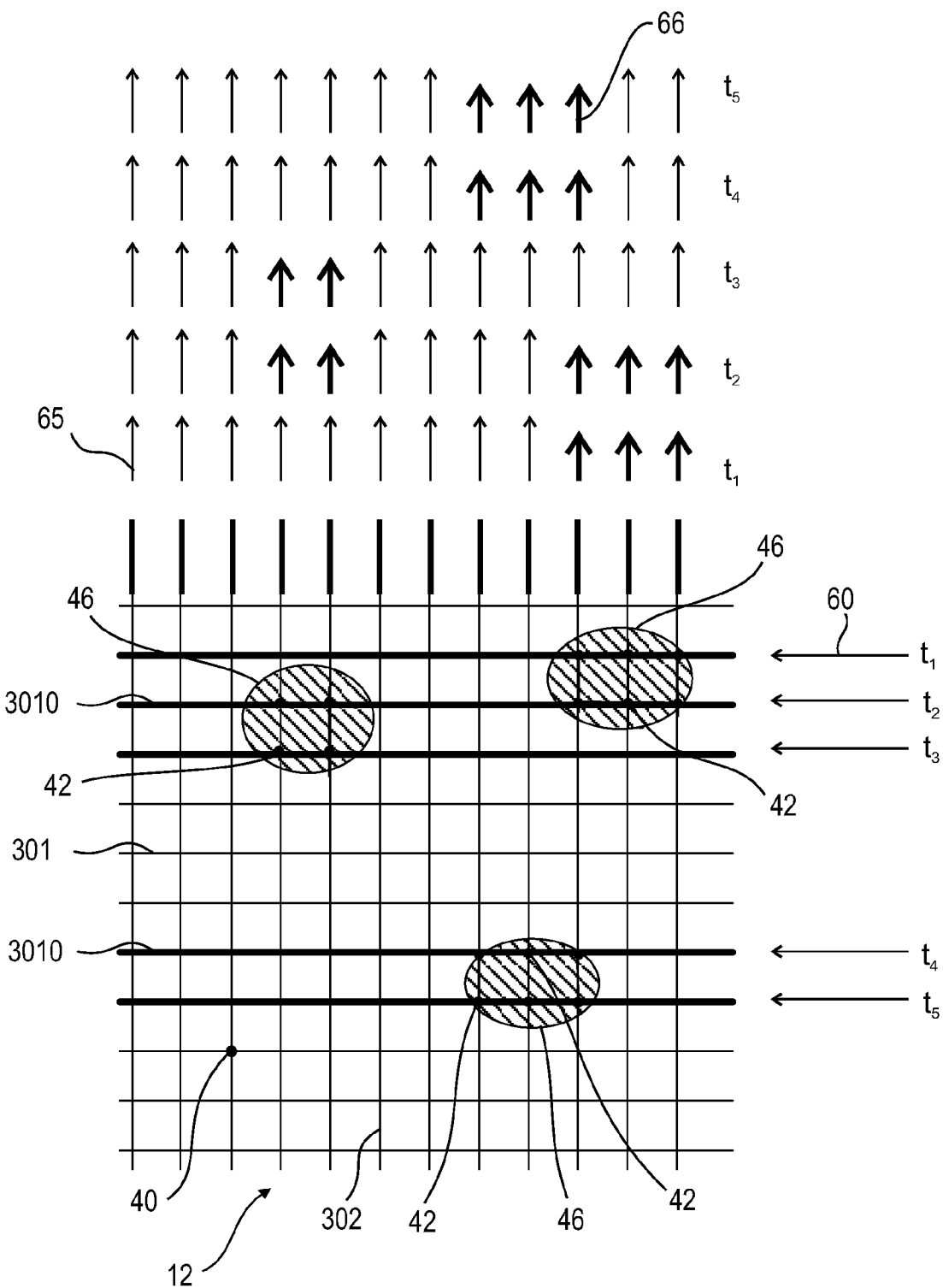
FIG. 12B is a schematic illustration of sensor outputs when scanning interacting lines of the second axis of the sensor to determine multi-touch interaction in accordance with some embodiments of the present invention.

According to some embodiments of the present invention, identified interacting lines 3010 along the second axis are scanned (for example, sequentially triggered) to determine locations of touch interaction. Referring now also to FIG. 12B showing a schematic illustration of sensor outputs when scanning interacting lines of the second axis of the sensor to determine multi-touch interaction in accordance with some embodiments of the present invention. According to some embodiments of the present invention, during a second stage of detection, the triggering axis is switched and only interacting lines 3010 are sequentially triggered to locate various finger touch 46 positions. In response to each triggering event e.g. triggering events at times $t_1, t_2, \ldots t_5$, output from all cross-lines 302 are sampled to obtain two-dimensional information regarding the various finger touch 46 locations and/or touch junctions 42 on interacting lines 3010.

According to some embodiments of the present invention, output from each of sensor lines are input to differential amplifiers and detection of output signals are obtained in a two step process once to detect all positive inputs to the differential amplifiers 340 (FIG. 11A) connection to ground is then toggled and the same active lines is triggered again so that all negative inputs to the differential amplifiers 340 are detected (FIG. 11B).

Reference is now made to FIG. 12C showing an exemplary time line of exemplary line sampling periods for a shortened method for multi-touch detection method with differential amplifiers for use with some embodiments of the present invention. According to some embodiments of the present invention, a digitizer first checks all the lines to detect interacting lines, e.g. lines 3010 sampling period 801. Detection is in a two stage process. In a first stage, all lines are triggered along one axis and half the lines on the other axis are sampled over a first sampling period 811 and the second set of lines are detected over a second sampling period 821. In some exemplary embodiments, once the interacting line are identified, during a second stage scanning of only the identified interaction lines is performed. Optionally, interaction lines are identified on both axes and only interaction lines identified on the sampling axis are sampled. Scanning time can be significantly reduced and thereby the refresh cycle of the digitizer. It is noted that although duration (or width) of sampling periods 811 and 821 are shown to be longer than line sampling periods 820 and 810, optionally all of sampling periods 811, 821, 810, and 820 have a common duration.

Typically, the refresh period is a function of the number of lines identified as interacting lines, e.g. the number of line sampling periods 810 and 820 required per refresh cycle. In some exemplary embodiments, a pre-defined number of lines are defined to be selected from scanning so that a constant refresh cycle period can be maintained regardless of changes in the number of interacting lines and the stylus can synchronized to a point in the refresh cycle. Optionally, 5 or 10 lines are selected as the pre-defined number of lines. In some exemplary embodiments, if less than 5 (or 10) lines are identified dummy lines are added to maintain a constant refresh cycle period.

Further details regarding multi-touch detection described in reference to FIGS. 12A-12C is described in US Patent Publication No. 20090273579 entitled "Multi-Touch Detection" assigned to N-Trig Ltd., and the contents of which is incorporated herein by reference.

According to some embodiments of the present invention, during simultaneous triggering of all lines to identify interacting lines as described in reference to FIGS. 12A and 12B, the differential amplifiers are at minimum gain and the stylus signal while in hover mode can not be easily detected. In some exemplary embodiments, digitizer 100 additionally samples output from the triggering lines to obtained higher gain readings so that the stylus pulse can be detected during a hovering mode.

Alternatively, in some exemplary embodiments, stylus detection during a period when all the lines on one axis are simultaneously triggered is avoided and stylus detection is only performed during sequential scanning of the lines. In such a case multiple transmission periods of the stylus pulse will be required before the full transmission period can be covered.

Figure 13A:
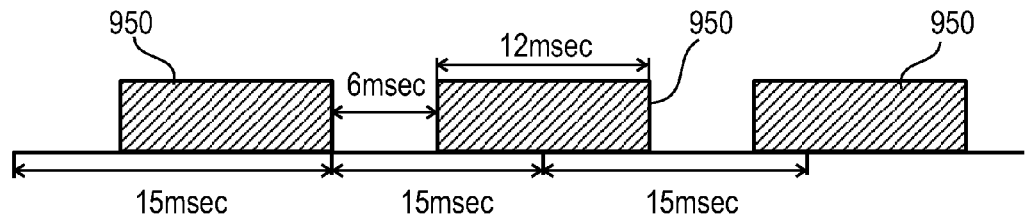
FIGS. 13A-13B is a simplified exemplary time line for detecting a stylus pulse after repeated refresh cycles of a digitizer scanning 10 selected lines in accordance with some embodiments of the present invention.
Figure 13B:
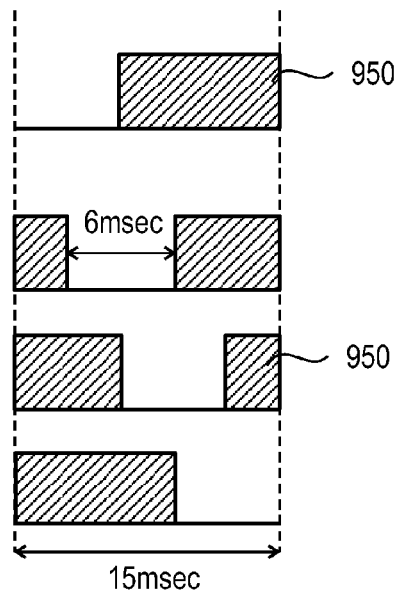

Reference is now made to FIGS. 13A and 13B showing a simplified exemplary time line for detecting a stylus pulse after repeated refresh cycles of a digitizer scanning 10 selected lines in accordance with some embodiments of the present invention. In some exemplary embodiment, when only 10 selected conductive lines are scanned, a time period over which all the lines on one axis are simultaneously triggered is spread over 6 ms and a time period 950 over which the 10 lines are scanned occupies a 12 msec period, 1.2 ms per line resulting in a refresh rate every 18 msec while a stylus transmits every 15 msec. If stylus detection is avoided when the lines are simultaneously triggered, detection of the first 6 msec is potentially lost. However, after a plurality of repeated cycles, positive detection of the stylus can be obtained, e.g. after 4 cycles. According to some embodiments of the present invention, due to a mismatch between a refresh rate of the digitizer, e.g. set at 18 msec refresh period and a transmission period of the stylus set at 15 msec scanning of sensor lines over subsequent refresh periods fill in an initial period in each refresh cycle where stylus detection is avoided. In the example shown in FIG. 13, a stylus signal can be picked up after 1-4 refresh periods of the digitizer. Optionally, stylus detection is avoided for a time period over which all the lines on one axis are simultaneously triggered plus a buffer period equaling the duration of the expected stylus pulse, e.g. 1.28 and the duration covered by chuck sampling period 950 is shortened by the duration of the expected stylus pulse, e.g. 1.28.

According to some embodiments of the present invention, coarse detection of the stylus during multi-touch scanning methods, e.g. with single end amplifier (FIG. 10) and/or differential set-up (FIGS. 11A, 11B, 11C, 12A, 12B, 12C) is by determining energy levels of output (in frequency of stylus AC burst signal) over one or more, e.g. typically more than one, line sampling period. Typically, coarse detection is determined if the energy level exceeds a pre-defined threshold for stylus detection. During this period, a first appearance in time of a stylus signal within one of the line sampling periods coarsely defines the location of the stylus signal in time.

Optionally, in response to a stylus signal being identified and its timing coarsely detected, a digitizer reverts to detecting the stylus (and finger touch detection) based on a differential setup as described in reference to FIGS. 4 and 5. Fine detection, synchronization and tracking may be as described in reference to FIG. 6.

Reference is now made to FIG. 14 showing a simplified exemplary time line for supporting multi-touch detection with detection of an autonomous asynchronous stylus after synchronization in accordance with some embodiments of the present invention. According to some embodiments of the present invention, multi-touch detection is supported during detection of an autonomous asynchronous stylus by using a time division method with defined time slots for finger touch detection and stylus detection. Typically, appearance of a stylus pulse controls the timing of detection since it is an autonomous signal. In some exemplary embodiments, a beacon pulse, e.g. pulse 110 together with a trailing pulse, e.g. pulse 130 is received during a first period of 2.6 msec of a digitizer refresh cycle (of 7.5 msec). In some exemplary embodiments, stylus detection is followed by a period over which 5-10, e.g. 5 of the sensor lines in digitizer 12 are selected using methods described in reference to FIG. 12A. In a following refresh cycle, stylus tip pressure is reported over a 1.3 msec period. In some exemplary embodiments, a 6.2 msec period is left after pressure signal sampling during which the 5 selected sensor lines can be scanned using methods described in reference to FIG. 12B. Typically such a time line is used to support up to two simultaneous finger touch interactions. Optionally the multi touch detection is lengthened to several refresh cycles to support more fingers.

It is noted that the present invention is not limited to the technical description of the digitizer system described herein. The present invention may also be applicable to other digitized sensor and touch screens known in the art, depending on their construction. The present invention may also be applicable to other touch detection methods known in the art.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method for operating a digitizer with a stylus wherein the digitizer includes a grid based digitizer sensor including conductive lines arrayed along a first and second axis of the digitizer sensor, the method comprising:
    triggering at a defined time within a refresh cycle of the digitizer at least a portion of the conductive lines with a triggering signal;
    detecting finger touch interaction with the digitizer during the refresh cycle in response to the triggering;
    transmitting a signal by the stylus;
    sensing the signal of the stylus with the digitizer sensor during the refresh cycle of the digitizer;
    determining a time within the refresh cycle of the digitizer for sampling the signal transmitted by the stylus; and
    detecting position of the stylus in subsequent refresh cycles responsive to sampling the signal transmitted by the stylus at the determined time within the refresh cycle.

2. The method according to claim 1, comprising simultaneously detecting finger touch interaction and stylus interaction with the digitizer.

3. The method according to claim 1, wherein the time within the refresh cycle of the digitizer is determined from output obtained from 1-4 conductive lines from which the signal of the stylus is most strongly detected.

4. The method according to claim 1, wherein determining the time within the refresh cycle of the digitizer for sampling the signal is performed while the stylus is hovering over the digitizer.

5. The method according to claim 1, comprising sampling output from only one of the first or the second axis of the digitizer for detecting the finger touch interaction.

6. The method according to claim 5, comprising switching to sampling output from both the first and the second axis for sampling the signal transmitted by the stylus.

7. The method of claim 1, wherein the signal transmitted by the stylus includes encoded information.

8. The method according to claim 7, wherein the encoded information includes information regarding an operational state of the stylus.

9. The method according to claim 7, wherein the encoded information includes information regarding user command.

10. The method according to claim 7, wherein the encoded information is selected from the group including: identification of the stylus, right click mode of the stylus, eraser mode of the stylus, pressure on tip of the stylus, and user selected color.

11. The method according to claim 7, wherein the information is encoded using at least one of amplitude shift keying, phase shift keying and frequency shift keying.

12. The method according to claim 7, wherein the information is encoded with digital encoding.

13. The method according to claim 7, wherein the information is encoded with analog encoding.

14. The method according to claim 7, wherein the digitizer decodes the encoded information responsive to sampling the signal transmitted by the stylus.

15. The method according to claim 1, wherein the digitizer identifies the signal of the stylus based on detection of a frequency of the signal.

16. The method according to claim 1, wherein the signal transmitted by the stylus includes a train of pulses in succession and wherein the digitizer samples the train of pulses over the refresh period of the digitizer.

17. The method according to claim 16, wherein the train of pulses is AC pulses.

* * * * *